(12) United States Patent
Hines et al.

(10) Patent No.: US 12,397,785 B1
(45) Date of Patent: Aug. 26, 2025

(54) SYSTEMS AND METHODS FOR DETECTING VEHICLE COLLISIONS

(71) Applicant: Geotab Inc., Oakville (CA)

(72) Inventors: Gregory Gordon Douglas Hines, Mississauga (CA); Benjamin John Gordon Gaffney, Wellesley (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/040,304

(22) Filed: Jan. 29, 2025

Related U.S. Application Data

(60) Provisional application No. 63/638,671, filed on Apr. 25, 2024, provisional application No. 63/551,581, filed on Feb. 9, 2024.

(51) Int. Cl.
*B60W 30/09* (2012.01)
*B60W 30/095* (2012.01)
*G08G 1/16* (2006.01)

(52) U.S. Cl.
CPC ........ *B60W 30/09* (2013.01); *B60W 30/0953* (2013.01); *G08G 1/166* (2013.01)

(58) Field of Classification Search
None
See application file for complete search history.

(56) References Cited

U.S. PATENT DOCUMENTS

| | | |
|---|---|---|
| 3,146,624 A | 9/1964 | Warren |
| 5,081,587 A | 1/1992 | Okano |
| 5,182,459 A | 1/1993 | Okano et al. |
| 5,262,949 A | 11/1993 | Okano et al. |
| 5,357,141 A | 10/1994 | Nitschke et al. |
| 5,431,441 A | 7/1995 | Okano |
| 5,440,913 A | 8/1995 | Crispin et al. |

(Continued)

FOREIGN PATENT DOCUMENTS

| | | |
|---|---|---|
| AU | 2021206287 A1 | 9/2022 |
| CA | 2284061 A1 | 3/2001 |

(Continued)

OTHER PUBLICATIONS

English Translation of CN-111599164-A (Year: 2020).*

(Continued)

*Primary Examiner* — Anshul Sood
(74) *Attorney, Agent, or Firm* — Lawrence Xin-Tao Yu

(57) ABSTRACT

Systems and methods for detecting vehicle collisions are provided. The methods involve operating at least one processor to: receive telematics data originating from a telematics device installed in a vehicle, the telematics data including acceleration data; detect a putative collision event based on the acceleration data exceeding a predetermined acceleration threshold; identify a portion of the acceleration data associated with the putative collision event, the portion of the acceleration data spanning from a time prior to the putative collision event to a time subsequent to the putative collision event; identify at least one impulse in the portion of the acceleration data based on a predetermined jerk threshold; use a trained classifier on the at least one impulse to determine that the putative collision event is a collision event; and in response to determining the collision event, trigger at least one action responsive to the collision event.

17 Claims, 16 Drawing Sheets

(56) References Cited

U.S. PATENT DOCUMENTS

| | | |
|---|---|---|
| 5,491,631 A | 2/1996 | Shirane et al. |
| 5,608,629 A | 3/1997 | Cuddihy et al. |
| 5,788,273 A | 8/1998 | Jeenicke et al. |
| 5,801,619 A | 9/1998 | Liu et al. |
| 5,809,439 A | 9/1998 | Damisch |
| 6,076,028 A | 6/2000 | Donnelly et al. |
| 6,157,892 A | 12/2000 | Hada et al. |
| 6,178,375 B1 | 1/2001 | Breunig |
| 6,185,410 B1 | 2/2001 | Greene |
| 6,223,125 B1 | 4/2001 | Hall |
| 6,246,961 B1 | 6/2001 | Sasaki et al. |
| 6,353,784 B1 | 3/2002 | Miyaguchi et al. |
| 6,405,132 B1 | 6/2002 | Breed et al. |
| 6,640,176 B2 | 10/2003 | Oswald et al. |
| 6,721,659 B2 | 4/2004 | Stopczynski |
| 6,732,034 B2 | 5/2004 | Hambsch et al. |
| 6,755,274 B2 | 6/2004 | Mattes et al. |
| 6,784,792 B2 | 8/2004 | Mattes et al. |
| 6,823,244 B2 | 11/2004 | Breed |
| 6,906,622 B2 | 6/2005 | Kleinschmidt et al. |
| 6,917,866 B2 | 7/2005 | Grotendiek et al. |
| 7,089,099 B2 | 8/2006 | Shostak et al. |
| 7,123,164 B2 | 10/2006 | Zoladek et al. |
| 7,158,016 B2 | 1/2007 | Cuddihy et al. |
| 7,233,235 B2 | 6/2007 | Pavlish |
| 7,272,480 B2 | 9/2007 | Mattes et al. |
| 7,284,769 B2 | 10/2007 | Breed |
| 7,295,909 B2 | 11/2007 | Recknagel |
| 7,421,322 B1 | 9/2008 | Silversmith et al. |
| 7,495,547 B2 | 2/2009 | Lich et al. |
| 7,519,460 B2 | 4/2009 | Roelleke et al. |
| 7,635,043 B2 | 12/2009 | Breed |
| 7,656,280 B2 | 2/2010 | Hines et al. |
| 7,706,946 B2 | 4/2010 | Willig et al. |
| 7,716,002 B1 | 5/2010 | Smith et al. |
| 7,725,216 B2 | 5/2010 | Kim |
| 7,734,394 B2 | 6/2010 | Williams |
| 7,786,864 B1 | 8/2010 | Shostak et al. |
| 7,822,517 B2 | 10/2010 | Lich et al. |
| 7,853,375 B2 | 12/2010 | Tuff |
| 7,933,702 B2 | 4/2011 | Theisen |
| 7,958,962 B2 | 6/2011 | Dukart et al. |
| 7,996,132 B2 | 8/2011 | Park |
| 8,024,084 B2 | 9/2011 | Breed |
| 8,032,275 B2 | 10/2011 | Lich |
| 8,032,276 B2 | 10/2011 | Cawse |
| 8,134,455 B2 | 3/2012 | Flick et al. |
| 8,138,900 B2 | 3/2012 | Mindner et al. |
| 8,150,575 B2 | 4/2012 | Ewerhart et al. |
| 8,155,841 B2 | 4/2012 | Erb |
| 8,437,903 B2 | 5/2013 | Willard |
| 8,589,015 B2 | 11/2013 | Willis et al. |
| 8,706,344 B2 | 4/2014 | Park |
| 8,768,560 B2 | 7/2014 | Willis |
| 8,768,572 B2 | 7/2014 | Lahmann et al. |
| 8,825,271 B2 | 9/2014 | Chen |
| 8,948,961 B2 | 2/2015 | Mack et al. |
| 8,977,426 B2 | 3/2015 | Cawse |
| 9,043,041 B2 | 5/2015 | Willis et al. |
| 9,043,077 B2 | 5/2015 | Doerr et al. |
| 9,308,876 B2 | 4/2016 | Doerr et al. |
| 9,373,149 B2 | 6/2016 | Abhyanker |
| 9,392,431 B2 | 7/2016 | Barfield, Jr. et al. |
| 9,466,214 B2 | 10/2016 | Fuehrer |
| 9,607,444 B2 | 3/2017 | Cawse |
| 9,650,007 B1 | 5/2017 | Snyder et al. |
| 9,746,492 B2 | 8/2017 | Rauh et al. |
| 9,849,852 B1 | 12/2017 | Larner et al. |
| 9,921,119 B2 | 3/2018 | Walz et al. |
| 10,072,933 B1 | 9/2018 | Surpi |
| 10,083,551 B1 | 9/2018 | Schmitt et al. |
| 10,186,090 B2 | 1/2019 | Lang et al. |
| 10,232,847 B2 | 3/2019 | Cordova et al. |
| 10,246,037 B1 | 4/2019 | Shea et al. |
| 10,282,996 B1 | 5/2019 | Buchbut et al. |
| 10,392,013 B2 | 8/2019 | Hakki et al. |
| 10,395,438 B2* | 8/2019 | Jenkins .................. H04L 67/12 |
| 10,399,524 B2 | 9/2019 | Gross et al. |
| 10,414,368 B2 | 9/2019 | Taranagara Joga et al. |
| 10,460,534 B1 | 10/2019 | Brandmaier et al. |
| 10,489,995 B2 | 11/2019 | Capozza |
| 10,558,218 B2* | 2/2020 | Tanaka .................. G08G 5/74 |
| 10,611,369 B2 | 4/2020 | Cinpinski et al. |
| 10,676,084 B2 | 6/2020 | Fujii |
| 10,688,927 B2 | 6/2020 | Lee et al. |
| 10,843,691 B2 | 11/2020 | Stobbe et al. |
| 10,957,124 B2 | 3/2021 | Cawse |
| 10,957,127 B2 | 3/2021 | Cawse |
| 10,994,728 B2 | 5/2021 | Stobbe et al. |
| 10,997,800 B1 | 5/2021 | Salodkar et al. |
| 10,999,374 B2 | 5/2021 | Elhattab et al. |
| 11,046,272 B2 | 6/2021 | Foltin |
| 11,080,568 B2 | 8/2021 | Elhattab et al. |
| 11,094,144 B2 | 8/2021 | Cawse |
| 11,172,347 B2 | 11/2021 | D'Addetta et al. |
| 11,214,212 B2 | 1/2022 | Oesterle et al. |
| 11,247,626 B2 | 2/2022 | Reckziegel et al. |
| 11,254,306 B2 | 2/2022 | Stobbe et al. |
| 11,334,753 B2 | 5/2022 | Vallespi-Gonzalez et al. |
| 11,340,348 B2 | 5/2022 | Hiromitsu et al. |
| 11,352,013 B1 | 6/2022 | Srinivasan et al. |
| 11,378,956 B2 | 7/2022 | Zhang et al. |
| 11,460,574 B2 | 10/2022 | Hiromitsu et al. |
| 11,494,921 B2 | 11/2022 | Elhattab et al. |
| 11,631,285 B2 | 4/2023 | Cawse |
| 11,758,358 B2 | 9/2023 | Stobbe et al. |
| 11,823,504 B1 | 11/2023 | Gulati et al. |
| 11,862,022 B2 | 1/2024 | Petersen et al. |
| 11,884,285 B2 | 1/2024 | Petersen et al. |
| 11,941,986 B2 | 3/2024 | Ellis et al. |
| 11,963,065 B2 | 4/2024 | Stobbe et al. |
| 12,094,260 B2 | 9/2024 | Cawse |
| 2003/0149530 A1 | 8/2003 | Stopczynski |
| 2003/0154017 A1 | 8/2003 | Ellis |
| 2003/0158638 A1 | 8/2003 | Yakes et al. |
| 2003/0191568 A1 | 10/2003 | Breed |
| 2004/0036261 A1 | 2/2004 | Breed |
| 2004/0102883 A1 | 5/2004 | Sala et al. |
| 2005/0040937 A1 | 2/2005 | Cuddihy et al. |
| 2006/0220826 A1 | 10/2006 | Rast |
| 2007/0088465 A1 | 4/2007 | Heffington |
| 2008/0086240 A1 | 4/2008 | Breed |
| 2008/0119966 A1 | 5/2008 | Breed et al. |
| 2008/0147265 A1 | 6/2008 | Breed |
| 2008/0161989 A1 | 7/2008 | Breed |
| 2008/0284575 A1 | 11/2008 | Breed |
| 2008/0294690 A1 | 11/2008 | McClellan et al. |
| 2009/0043506 A1 | 2/2009 | Breed |
| 2009/0048750 A1 | 2/2009 | Breed |
| 2009/0051510 A1 | 2/2009 | Follmer et al. |
| 2009/0055044 A1 | 2/2009 | Dienst |
| 2009/0228157 A1 | 9/2009 | Breed |
| 2009/0237226 A1 | 9/2009 | Okita |
| 2009/0256690 A1 | 10/2009 | Golenski |
| 2009/0276115 A1 | 11/2009 | Chen |
| 2010/0033333 A1 | 2/2010 | Victor et al. |
| 2010/0052945 A1 | 3/2010 | Breed |
| 2010/0065344 A1 | 3/2010 | Collings, III |
| 2010/0070107 A1 | 3/2010 | Berkobin et al. |
| 2010/0141435 A1 | 6/2010 | Breed |
| 2010/0207754 A1 | 8/2010 | Shostak et al. |
| 2010/0228432 A1 | 9/2010 | Smith et al. |
| 2010/0235891 A1 | 9/2010 | Oglesbee et al. |
| 2010/0256863 A1 | 10/2010 | Nielsen et al. |
| 2010/0268423 A1 | 10/2010 | Breed |
| 2011/0060496 A1 | 3/2011 | Nielsen et al. |
| 2011/0093162 A1 | 4/2011 | Nielsen et al. |
| 2011/0112717 A1 | 5/2011 | Resner |
| 2011/0130915 A1 | 6/2011 | Wright et al. |
| 2011/0153367 A1 | 6/2011 | Amigo et al. |
| 2011/0202152 A1 | 8/2011 | Barton et al. |
| 2011/0202305 A1 | 8/2011 | Willis et al. |
| 2011/0224865 A1 | 9/2011 | Gordon et al. |
| 2011/0226038 A1 | 9/2011 | Donahoe et al. |

(56) References Cited

U.S. PATENT DOCUMENTS

| | | |
|---|---|---|
| 2012/0022780 A1 | 1/2012 | Kulik et al. |
| 2012/0071151 A1 | 3/2012 | Abramson et al. |
| 2012/0075095 A1 | 3/2012 | Howard et al. |
| 2012/0077439 A1 | 3/2012 | Howard et al. |
| 2012/0077440 A1 | 3/2012 | Howard et al. |
| 2012/0077441 A1 | 3/2012 | Howard et al. |
| 2012/0078569 A1 | 3/2012 | Doerr et al. |
| 2012/0089299 A1 | 4/2012 | Breed |
| 2012/0095674 A1 | 4/2012 | Lee et al. |
| 2012/0101855 A1 | 4/2012 | Collins et al. |
| 2012/0129544 A1 | 5/2012 | Hodis et al. |
| 2012/0210498 A1* | 8/2012 | Mack .............. A42B 3/0466 2/209.13 |
| 2012/0224827 A1 | 9/2012 | Tano |
| 2013/0218603 A1 | 8/2013 | Hagelstein et al. |
| 2013/0274955 A1 | 10/2013 | Rosenbaum |
| 2013/0302758 A1 | 11/2013 | Wright |
| 2013/0317693 A1 | 11/2013 | Jefferies et al. |
| 2013/0325250 A1 | 12/2013 | Cawse |
| 2013/0331055 A1 | 12/2013 | Mckown et al. |
| 2013/0332004 A1 | 12/2013 | Gompert et al. |
| 2014/0253308 A1 | 9/2014 | Kanda |
| 2014/0257051 A1* | 9/2014 | Cam .............. A61B 5/0004 600/595 |
| 2014/0288727 A1 | 9/2014 | Everhart et al. |
| 2015/0025917 A1 | 1/2015 | Stempora |
| 2015/0120147 A1* | 4/2015 | Okamura .......... B60R 21/0132 701/1 |
| 2015/0142209 A1 | 5/2015 | Breed |
| 2015/0206357 A1 | 7/2015 | Chen et al. |
| 2015/0206358 A1 | 7/2015 | Chen et al. |
| 2015/0258991 A1 | 9/2015 | Fletcher et al. |
| 2016/0094964 A1 | 3/2016 | Barfield, Jr. et al. |
| 2016/0117868 A1 | 4/2016 | Mitchell et al. |
| 2016/0232721 A1 | 8/2016 | Singh et al. |
| 2017/0008517 A1 | 1/2017 | Himi |
| 2017/0053461 A1 | 2/2017 | Pal et al. |
| 2017/0101093 A1 | 4/2017 | Barfield, Jr. et al. |
| 2017/0132856 A1 | 5/2017 | Cawse |
| 2017/0147420 A1 | 5/2017 | Cawse et al. |
| 2017/0149601 A1 | 5/2017 | Cawse et al. |
| 2017/0149602 A1 | 5/2017 | Cawse et al. |
| 2017/0150442 A1 | 5/2017 | Cawse et al. |
| 2017/0201619 A1 | 7/2017 | Cohen et al. |
| 2017/0210323 A1 | 7/2017 | Cordova et al. |
| 2017/0236340 A1 | 8/2017 | Hagan, Jr. |
| 2017/0263120 A1 | 9/2017 | Durie, Jr. et al. |
| 2017/0309092 A1 | 10/2017 | Rosenbaum |
| 2017/0330455 A1 | 11/2017 | Kikuchi et al. |
| 2018/0025235 A1 | 1/2018 | Fridman |
| 2018/0025636 A1* | 1/2018 | Boykin .......... G08G 1/096725 701/1 |
| 2018/0075309 A1 | 3/2018 | Sathyanarayana et al. |
| 2018/0108189 A1 | 4/2018 | Park et al. |
| 2018/0114377 A1 | 4/2018 | Dyeyev |
| 2018/0126938 A1 | 5/2018 | Cordova et al. |
| 2018/0178745 A1 | 6/2018 | Foltin |
| 2018/0188032 A1 | 7/2018 | Ramanandan et al. |
| 2018/0188384 A1 | 7/2018 | Ramanandan et al. |
| 2018/0218034 A1 | 8/2018 | Sainaney |
| 2018/0218549 A1 | 8/2018 | Wahba et al. |
| 2018/0225974 A1 | 8/2018 | Molin et al. |
| 2018/0293446 A1 | 10/2018 | Becker et al. |
| 2018/0326936 A1 | 11/2018 | Ghannam et al. |
| 2018/0365772 A1 | 12/2018 | Thompson et al. |
| 2018/0365999 A1 | 12/2018 | Wiklinska et al. |
| 2019/0031100 A1 | 1/2019 | Lee et al. |
| 2019/0100198 A1 | 4/2019 | Hakki et al. |
| 2019/0102840 A1 | 4/2019 | Perl et al. |
| 2019/0118751 A1 | 4/2019 | Ghannam et al. |
| 2019/0122551 A1 | 4/2019 | Madrigal et al. |
| 2019/0139327 A1 | 5/2019 | Hay, II |
| 2019/0202448 A1 | 7/2019 | Pal et al. |
| 2019/0236861 A1 | 8/2019 | Amendolagine et al. |
| 2019/0279440 A1 | 9/2019 | Ricci |
| 2019/0334763 A1 | 10/2019 | Cawse et al. |
| 2019/0344740 A1 | 11/2019 | Hakki et al. |
| 2019/0378355 A1 | 12/2019 | Bruneel, II et al. |
| 2020/0001865 A1 | 1/2020 | Stobbe et al. |
| 2020/0017048 A1* | 1/2020 | Shea .............. G07C 5/008 |
| 2020/0209873 A1 | 7/2020 | Chen |
| 2020/0294401 A1 | 9/2020 | Kerecsen |
| 2020/0334762 A1 | 10/2020 | Carver et al. |
| 2020/0334928 A1* | 10/2020 | Bourke .............. G06N 5/04 |
| 2020/0342235 A1 | 10/2020 | Tsai et al. |
| 2020/0342611 A1 | 10/2020 | Elhattab et al. |
| 2020/0344301 A1 | 10/2020 | Elhattab et al. |
| 2020/0380799 A1 | 12/2020 | Cawse |
| 2021/0089572 A1 | 3/2021 | Lawlor et al. |
| 2021/0166500 A1 | 6/2021 | Cawse |
| 2021/0200241 A1* | 7/2021 | Oyama .............. G08G 1/0112 |
| 2021/0227031 A1 | 7/2021 | Elhattab et al. |
| 2021/0279976 A1 | 9/2021 | Cawse |
| 2021/0300346 A1 | 9/2021 | Stobbe et al. |
| 2021/0380059 A1 | 12/2021 | Jones et al. |
| 2022/0024400 A1 | 1/2022 | Ahmad et al. |
| 2022/0024451 A1* | 1/2022 | Park .............. B60W 30/08 |
| 2022/0041169 A1 | 2/2022 | Krishna et al. |
| 2022/0118931 A1 | 4/2022 | Qi et al. |
| 2022/0161789 A1 | 5/2022 | Stobbe et al. |
| 2022/0242427 A1 | 8/2022 | Petersen et al. |
| 2022/0246036 A1 | 8/2022 | Petersen et al. |
| 2023/0059859 A1 | 2/2023 | Davidson et al. |
| 2023/0281339 A1 | 9/2023 | Chen et al. |
| 2023/0377380 A1 | 11/2023 | Cawse |
| 2023/0377462 A1 | 11/2023 | Ellis et al. |
| 2023/0379189 A1 | 11/2023 | Mihovics et al. |
| 2024/0071230 A1 | 2/2024 | Petersen et al. |
| 2024/0127695 A1 | 4/2024 | Ellis et al. |
| 2024/0179493 A1 | 5/2024 | Stobbe et al. |

FOREIGN PATENT DOCUMENTS

| | | | |
|---|---|---|---|
| CA | 2735458 A1 | 9/2012 | |
| CA | 2940151 A1 | 8/2015 | |
| CA | 3008512 A1 | 12/2018 | |
| CA | 3119428 A1 | 5/2019 | |
| CA | 3092032 A1 | 8/2019 | |
| CN | 104062465 A | 9/2014 | |
| CN | 104460464 A | 3/2015 | |
| CN | 105678218 A | 6/2016 | |
| CN | 104376154 B | 5/2018 | |
| CN | 108062600 A | 5/2018 | |
| CN | 109049006 A | 12/2018 | |
| CN | 111599164 A * | 8/2020 | ............ B60W 30/09 |
| DE | 102007007848 A1 | 6/2008 | |
| DE | 102014225790 A1 | 6/2016 | |
| EP | 1569176 A2 | 8/2005 | |
| EP | 1893452 B1 | 1/2010 | |
| EP | 2147829 B1 | 3/2012 | |
| EP | 2289753 B1 | 2/2013 | |
| EP | 2261087 B1 | 3/2013 | |
| EP | 2261089 B1 | 3/2013 | |
| EP | 2398676 B1 | 5/2013 | |
| EP | 2311691 B1 | 12/2013 | |
| EP | 2854112 A1 | 4/2015 | |
| EP | 3171352 A2 | 5/2017 | |
| EP | 3187372 A2 | 7/2017 | |
| EP | 3281846 A1 | 2/2018 | |
| EP | 3529789 B1 | 10/2020 | |
| EP | 3786903 A1 | 3/2021 | |
| EP | 3873780 A1 | 9/2021 | |
| EP | 3768558 B1 | 2/2022 | |
| EP | 3820753 B1 | 8/2023 | |
| FR | 2944621 A1 | 10/2010 | |
| GB | 2485971 A | 6/2012 | |
| GB | 2506365 A | 4/2014 | |
| GB | 2541668 A | 3/2017 | |
| GB | 2578647 A | 5/2020 | |
| GB | 2602171 A | 6/2022 | |
| JP | 2003191817 A | 7/2003 | |
| JP | 2008073267 A | 4/2008 | |
| KR | 20160088099 A | 7/2016 | |
| WO | 0019239 A2 | 4/2000 | |

(56) References Cited

FOREIGN PATENT DOCUMENTS

| WO | 0052443 A1 | 9/2000 |
|---|---|---|
| WO | 2004106883 A1 | 12/2004 |
| WO | 2013055487 A1 | 4/2013 |
| WO | 2013103569 A1 | 7/2013 |
| WO | 2013105869 A1 | 7/2013 |
| WO | 2013184620 A1 | 12/2013 |
| WO | 2014177891 A1 | 11/2014 |
| WO | 2017136627 A1 | 8/2017 |
| WO | 2019097245 A1 | 5/2019 |
| WO | 2019222358 A1 | 11/2019 |
| WO | 2023235251 A1 | 12/2023 |

OTHER PUBLICATIONS

Ahmed S., "Fleet Manager's Guide to Accident Reconstruction with Telematics Data," Geotab, Oct. 20, 2016, pp. 1-17.

Aloul F., et al., "iBump: Smartphone Application to Detect Car Accidents," International Conference on Industrial Automation, Information and Communications Technology (IAICT), IEEE, 2014, pp. 52-56.

Altun K., et al., "Human Activity Recognition Using Inertial/Magnetic Sensor Units," International Workshop on Human Behavior Understanding, Springer-Verlag Berlin Heidelberg, 2010, pp. 38-51.

Apte C., et al., "Data Mining with Decision Trees and Decision Rules," Future Generation Computer Systems, 1997, vol. 13 (2-3), pp. 197-210.

Baoli L., et al., "An Improved k-Nearest Neighbor Algorithm for Text Categorization," Proceedings of the 20th International Conference on Computer Processing of Oriental Languages, Shenyang, China, 2003, arXiv preprint cs/0306099, Jun. 16, 2003, 7 Pages.

Bayat A., et al., "A Study on Human Activity Recognition Using Accelerometer Data from Smartphones," Procedia Computer Science, 2014, vol. 34, pp. 450-457.

Bebis G., et al., "Feed-forward Neural Networks," IEEE Potentials, Oct.-Nov. 1994, vol. 13, No. 4, pp. 27-31.

Bottou L., "Large-Scale Machine Learning with Stochastic Gradient Descent," Proceedings of COMPSTAT, Springer-Verlag Berlin Heidelberg, 2010, pp. 177-186.

Breiman L., "Random Forests," Machine Learning, Oct. 2001, vol. 45, No. 1, pp. 5-32.

Broome S., "Objectively Recognizing Human Activity in Body-Worn Sensor Data with (More or Less) Deep Neural Networks," KTH Royal Institute of Technology School of Computer Science and Communication, 2017, 64 Pages.

Brown B., et al., "Are You Ready for the Era of 'Big Data'?," McKinsey Quarterly, Oct. 2011, vol. 4, No. 1, pp. 1-12.

Buscarino A., et al., "Driving Assistance Using Smartdevices," IEEE International Symposium on Intelligent Control (ISIC), Oct. 8-10, 2014, pp. 838-842.

Cawse, "Vin Based Accelerometer Threshold," U.S. Appl. No. 18/135,252, filed Apr. 17, 2023, 49 Pages.

Chong M., et al., "Traffic Accident Analysis Using Machine Learning Paradigms," Informatica, 2005, vol. 29, No. 11, pp. 89-98, Jan. 1, 2005.

Christ P.F., "Convolutional Neural Networks for Classification and Segmentation of Medical Images," Ph.D. Thesis, Technical University of Munich, 2017, 137 Pages.

Dimitrakopoulos G., et al., "Intelligent Transportation Systems," IEEE Vehicular Technology Magazine, Mar. 15, 2010, vol. 5, No. 1, pp. 77-84.

Ellis et al., Methods for characterizing a low-impact vehicle collision using high-rate acceleration data. Co-pending U.S. Appl. No. 18/363,340, filed Aug. 1, 2023.

Errejon A., et al., "Use of Artificial Neural Networks in Prostate Cancer," Molecular Urology, Dec. 2001, vol. 5, No. 4, pp. 153-158.

European Commission: "2017 Road Safety Statistics: What is behind the Figures?," European Commission—Fact Sheet, Apr. 10, 2018, 5 Pages, [Last Accessed on Dec. 5, 2019] Retrieved from URL: http://europa.eu/rapid/press-release_MEMO-18--2762_en.pdf.

European Commission: "Ecall in all New Cars from Apr. 2018," Digital Single Market, Digibyte, Apr. 28, 2015, 3 Pages, [Last Accessed on Dec. 5, 2019] Retrieved from URL: https://ec.europa.eu/digital-single-market/en/news/ecall-all-new-cars-april-2018.

European Commission: "Statistics—Accidents Data," Community Database on Accidents on the Roads in Europe (CARE) Report, Dec. 9, 2020,1 Page, [Last Accessed on Dec. 9, 2020] Retrieved from URL: https://ec.europa.eu/transport/roadsafety/specialist/statistics_en.

European Commission: "The Interoperable EU-wide eCall," Mobility and Transport, May 12, 2019, 6 Pages, [Last Accessed on Dec. 5, 2019] Retrieved from URL: https://ec.europa.eu/transport/themes/its/road/action_plan/ecall_en.

European Commission: "Traffic Safety Basic Facts 2017," Main Figures, European Road Safety Observatory, 2017, 21 Pages, [Last Accessed on Dec. 5, 2019] Retrieved from URL: https://ec.europa.eu/transport/road_safety/sites/roadsafety/files/pdf/statistics/dacota/bfs2017_main_figures.pdf.

European Union: "Regulation (EU) 2015/758 of the European Parliament and of the Council of Apr. 29, 2015 Concerning type-Approval Requirements for the Deployment of the eCall in-vehicle System based on the 112 Service and Amending Directive 2007/46/EC," Official Journal of the European Union, May 19, 2015, 17 Pages, [Last Accessed on Dec. 5, 2019] Retrieved from URL: https://eur-lex.europa.eu/legal-content/EN/TXT/?uri=CELEX:32015R0758.

Extended European Search Report for European Application No. 19181267.6, mailed Nov. 21, 2019, 7 Pages.

Extended European Search Report for European Application No. 19193207.8, mailed Nov. 12, 2019, 7 Pages.

Extended European Search Report for European Application No. 22152376.4, mailed May 31, 2022, 9 Pages.

Extended European Search Report for European Application No. 23203207.8, mailed Apr. 8, 2024, 7 pages.

Frigge M., et al., "Some Implementations of the Boxplot," The American Statistician, Feb. 1989, vol. 43, No. 1, 6 Pages.

Gentleman R., et al., "Unsupervised Machine Learning," Bioconductor Case Studies, Springer, New York, 2008, pp. 137-157.

Glorot X., et al., "Understanding the Difficulty of Training Deep FeedForward Neural Networks," Proceedings of the Thirteenth International Conference on Artificial Intelligence and Statistics, Mar. 31, 2010, vol. 9, pp. 249-256.

Goetz M., et al., "Extremely Randomized Trees Based Brain Tumor Segmentation," Proceeding of BRATS challenge—MICCAI, Jan. 2014, 7 Pages.

Gorjestani A., et al., "Impedance Control for Truck Collision Avoidance," Proceedings of the IEEE American Control Conference (ACC), Jun. 28, 2000, vol. 3, pp. 1519-1524.

Gu J., et al., "Recent Advances in Convolutional Neural Networks," Pattern Recognition, 2017, 38 Pages.

Gurney K., "An Introduction to Neural Networks," CRC press, Aug. 5, 1997, 7 Pages.

Harms J., "Terrestrial Gravity Fluctuations," Living Reviews in Relativity, Dec. 2, 2015, vol. 18, No. 1, 150 Pages.

Hecht-Nielsen R., "Theory of the Backpropagation Neural Network," Neural Networks for Perception, Academic Press, Inc., 1992, pp. 65-93.

Hinton G., et al., "Deep Neural Networks for Acoustic Modeling in Speech Recognition," The shared views of four research groups, IEEE Signal Processing Magazine, Nov. 2012, vol. 29, No. 6, pp. 82-97.

Hou Z., et al., A Real Time Vehicle Collision Detecting and Reporting System Based on Internet of Things Technology, 2017 3rd IEEE International Conference on Computer and Communications (ICCC), Dec. 13, 2017, pp. 1135-1139.

Iandola F.N., et al., "SqueezeNet: AlexNet-Level Accuracy with 50x Fewer Parameters and Less Than 0.5 MB Model Size," arXiv preprint arXiv: 1602.07360, Feb. 24, 2016, pp. 1-13.

(56) References Cited

OTHER PUBLICATIONS

Ioffe S., et al., "Batch Normalization: Accelerating Deep Network Training by Reducing Internal Covariate Shift," arXiv preprint arXiv: 1502.03167v3, Feb. 11, 2015, pp. 1-11.
Jain A.K., et al., "Data Clustering: 50 Years Beyond K-Means," Pattern Recognition Letters, Jun. 1, 2010, vol. 31, No. 8, pp. 651-666.
Jolliffe I.T., "Principal Component Analysis and Factor Analysis," Principal Component Analysis, Springer, 1986, pp. 111-149.
Junior J.F., et al., "Driver Behavior Profiling: An Investigation with Different Smartphone Sensors and Machine Learning," PLoS One, Aug. 10, 2017, vol. 12, No. 4, pp. 1-16.
Keller J.M., et al., "A Fuzzy K-Nearest Neighbor Algorithm," IEEE Transactions on Systems, Man, and Cybernetics, Jul. 1985, vol. 14, No. 4, pp. 580-585.
Keogh E., et al., "Exact Indexing of Dynamic Time Warping," Knowledge and Information Systems, Mar. 1, 2005, vol. 7, No. 3, 29 Pages.
Khorrami P., et al., "Do Deep Neural Networks Learn Facial Action Units When Doing Expression Recognition?," Proceedings of the IEEE International Conference on Computer Vision Workshops, 2015, pp. 19-27.
Kitchin R., "The Data Revolution: Big Data, Open Data, Data Infrastructures and Their Consequences," Sage, Aug. 18, 2014, 244 Pages.
Krizhevsky A., et al., "Imagenet Classification With Deep Convolutional Neural Networks," Communications of the ACM, Jun. 2017, vol. 60, No. 6, pp. 84-90.
Larose D.T., "K-nearest Neighbor Algorithm," Discovering Knowledge in Data: an Introduction to Data Mining, 2005, pp. 90-106.
Lecun Y., et al., "Backpropagation Applied to Handwritten Zip Code Recognition," Neural Computation, Dec. 1989, vol. 1, No. 4, pp. 541-551.
Lee H., et al., "Predictive Risk Assessment Using Cooperation Concept for Collision Avoidance of Side Crash in Autonomous Lane Change Systems," 2017 17th International Conference on Control, Automation and Systems (ICCAS), Oct. 18, 2017, pp. 47-52.
Li et al., An improved k-nearest neighbor algorithm for text categorization. arXiv preprint cs/0306099. Jun. 16, 2003:7 pages.
Liao T.W., "Clustering of Time Series Data—a Survey," Pattern Recognition, Nov. 1, 2005, vol. 38, No. 11, pp. 1857-1874.
Liaw A., et al., "Classification and Regression by RandomForest," R News, Dec. 3, 2002, vol. 2/3, pp. 1-41.
McCulloch W.S., et al., "A Logical Calculus of the Ideas Immanent in Nervous Activity," The Bulletin of Mathematical Biophysics, Dec. 1, 1943, vol. 5, No. 4, pp. 115-133.
Michalski R.S., et al., "Machine Learning: An Artificial Intelligence Approach," Springer Science & Business Media, 2013, 587 Pages.
Naik G.R., "Advances in Principal Component Analysis: Research and Development," Springer, 2017, 256 Pages.
Nair V., et al., "Rectified Linear Units Improve Restricted Boltzmann Machines, " Proceedings of the 27th International Conference on Machine Learning (ICML-10), Jan. 1, 2010, 8 Pages.
Neter J., et al., "Applied Linear Statistical Models," Chicago: Irwin, Feb. 1996, Fourth Edition, 1432 pages.
Nyamati V., et al., "Intelligent Collision Avoidance and Safety Warning System for Car Driving," 2017 International Conference on Intelligent Computing and Control Systems (ICICCS), Jun. 15, 2017, pp. 791-796.
Olah C., et al., "The Building Blocks of Interpretability," Distill, Mar. 6, 2018, vol. 3, No. 3, pp. 1-22.
Perez L., et al., "The Effectiveness of Data Augmentation in Image Classification Using Deep Learning," arXiv Preprint arXiv:1712.04621V1, Dec. 13, 2017, 8 Pages.
Peterson, et al., "Methods for Characterizing a Vehicle Collision," U.S. Appl. No. 17/404,816, filed Aug. 17, 2021, 112 Pages.
Peterson, et al., "Systems for Characterizing a Vehicle Collision," U.S. Appl. No. 17/404,784, filed Aug. 17, 2021, 113 Pages.
Qian G., et al., "Similarity Between Euclidean and Cosine Angle Distance for Nearest Neighbor Queries," Proceedings of the 2004 ACM Symposium on Applied Computing, ACM, Mar. 14-17, 2004, pp. 1232-1237.
Redei G.P., "Introduction in: Encyclopedia of Genetics, Genomics, Proteomics, and Informatics," Springer Link, Dordrecht, 2008, 2 Pages, [Last Accessed on Dec. 9, 2020] Retrieved from URL: https://link.springer.com/referencework/10.1007/978-I-4020-6754-9.
Redei G.P., "Principal Component Analysis in: Encyclopedia of Genetics, Genomics, Proteomics, and Informatics," Springer Link, Dordrecht, 2008, p. 672.
Robert C., et al., "Machine Learning, a Probabilistic Perspective," Chance, Apr. 23, 2014, vol. 27, No. 2, pp. 62-63.
Rupok M.S.A., et al., "MEMS Accelerometer Based Low-Cost Collision Impact Analyzer," 2016 IEEE International Conference on Electro Information Technology (EIT), May 19, 2016, pp. 0393-0396.
Sakoe H., et al., "Dynamic Programming Algorithm Optimization for Spoken Word Recognition," IEEE Transactions on Acoustics, Speech, and Signal Processing, Feb. 1978, vol. 26, No. 1, pp. 43-49.
Salvador S., et al., "FastDTW: Toward Accurate Dynamic Time Warping in Linear Time and Space," Intelligent Data Analysis, Jan. 1, 2007, vol. 11, No. 5, 11 Pages.
Shalizi C.R., "Advanced Data Analysis from an Elementary Point of View," Sep. 8, 2019, 828 pages.
Shazeer N., et al., "Outrageously Large Neural Networks: The Sparsely-Gated Mixture-of-Experts Layer," ICLR, arXiv Preprint arXiv: 1701.06538, Jan. 23, 2017, pp. 1-19.
Smith A., "Image Segmentation Scale Parameter Optimization and Land Cover Classification Using the Random Forest Algorithm," Journal of Spatial Science, Jun. 1, 2010, vol. 55, No. 1, pp. 69-79.
Spanish Search Report for Spanish Application No. P201830655, mailed Mar. 25, 2019, 9 Pages.
Srivastava N., et al., "Dropout: a Simple Way to Prevent Neural Networks From Overfitting," The Journal of Machine Learning Research, Jan. 1, 2014, vol. 15, No. 1, pp. 1929-1958.
Stobbe, et al., "Characterizing a Vehicle Collision," U.S. Appl. No. 17/670,007, filed Feb. 11, 2022, 21 Pages.
Stobbe P., "Road Accident Prediction and Characterization Using Convolutional Neural Networks," Master's Thesis, Institute for Data Processing Technische Universitat Munchen, Jul. 2, 2018, 93 Pages.
Sug H., et al., "The Effect of Training Set Size for the Performance of Neural Networks of Classification," WSEAS Transactions on Computers, Nov. 1, 2010, vol. 9, No. 11, pp. 1297-1306.
Ten Holt G.A., et al., "Multi-dimensional Dynamic Time Warping for Gesture Recognition," Thirteenth Annual Conference of the Advanced School for Computing and Imaging, Jun. 13, 2007, 8 Pages.
Thompson M., "Regression Methods in the Comparison of Accuracy," Analyst, Oct. 1982, vol. 107, No. 1279, pp. 1169-1180.
Tomas-Gabarron J-B., et al., "Vehicular Trajectory Optimization for Cooperative Collision Avoidance at High Speeds," IEEE Transactions on Intelligent Transportation Systems, Jul. 16, 2013, vol. 14, No. 4, pp. 1930-1941.
Virtanen N., et al., "Impacts of an Automatic Emergency Call System on Accident Consequences," Proceedings of the 18th ICTCT, Workshop Transport Telemetric and Safety, Finland, 2005, pp. 1-6.
Voulodimos A., et al., "Deep Learning for Computer Vision: A Brief Review," Computational Intelligence and Neuroscience, Feb. 1, 2018, vol. 2018, Article ID 7068349, pp. 1-13.
Wang et al., A collision avoidance system with fuzzy danger level detection. 2017 IEEE Intelligent Vehicles Symposium (IV) Jun. 11, 2017:283-8.
Wang J., et al., "Improving Nearest Neighbor Rule With a Simple Adaptive Distance Measure," Pattern Recognition Letters, Jan. 15, 2007, vol. 28, No. 2, pp. 207-213.
Werbos P.J., "Backpropagation Through Time: What It Does and How to Do It," Proceedings of the IEEE, Oct. 1990, vol. 78, No. 10, pp. 1550-1560.

(56) References Cited

OTHER PUBLICATIONS

Witten I.H., et al., "Data Mining: Practical Machine Learning Tools and Techniques," Morgan Kaufmann, Fourth Edition, 2017, 646 Pages.
Xu B., et al., "Empirical Evaluation of Rectified Activations in Convolutional Network," ArXiv Preprint ArXiv: 1505.00853V2 [cs.LG], Nov. 27, 2015, 5 Pages.
Yamane T., "Statistics: An introductory Analysis," Harper Row, New York, Third Edition, 1973, 1146 Pages.
Yee T.H., et al., "Mobile Vehicle Crash Detection System," 2018 IEEE International Workshop on Advanced Image Technology (IWAIT), Jan. 7, 2018, pp. 1-4.
Yosinski J., et al., "Understanding Neural Networks Through Deep Visualization," ArXiv Preprint ArXiv: 1506.06579V1 [cs.CV], Jun. 22, 2015, pp. 1-12.
Zhang M., et al., "A Feature Selection-based Framework for Human Activity Recognition Using Wearable Multimodal Sensors," Proceedings of the 6th International Conference on Body Area Networks. ICST (Institute for Computer Sciences, Social-informatics and Telecommunications Engineering), Nov. 7, 2011, pp. 92-98.
Zou K.H., et al., "Correlation and Simple Linear Regression1," Radiology, Jun. 2003, vol. 227, No. 3, pp. 617-628.
International Search Report for International Application No. PCT/CA2025/050113, mailed Apr. 8, 2025, 7 pages.
Written Opinion for International Application No. PCT/CA2025/050113, mailed on Apr. 8, 2025, 7 pages.
Extended European Search Report for European Application No. 25155696.5, mailed Jun. 16, 2025, 13 pages.

\* cited by examiner

SYSTEMS AND METHODS FOR DETECTING VEHICLE COLLISIONS

CROSS-REFERENCE TO RELATED APPLICATIONS

This application claims priority to U.S. Provisional Patent Application No. 63/551,581 filed Feb. 9, 2024 and titled "SYSTEMS AND METHODS FOR DETECTING VEHICLE COLLISIONS" and U.S. Provisional Patent Application No. 63/638,671 filed Apr. 25, 2024 and titled "SYSTEMS AND METHODS FOR DETECTING VEHICLE COLLISIONS", the contents of which are incorporated herein by reference for all purposes.

FIELD

The embodiments described herein generally relate to vehicles, telematics devices, and telematics data, and in particular, to detecting vehicle collisions using telematics data.

BACKGROUND

The following is not an admission that anything discussed below is part of the prior art or part of the common general knowledge of a person skilled in the art.

Traffic accidents, collisions, or crashes involving vehicles can have serious consequences. Crashes can result in serious injury or even death to road users, such as vehicle passengers, cyclists, and pedestrians. Collisions can also result in significant damage to personal property. Timely identification or detection of vehicle collisions can help to remedy and minimize the repercussions of collisions. However, it can be difficult to detect vehicle collisions in an accurate manner.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for detecting vehicle collisions. The method involves operating at least one processor to: receive telematics data originating from a telematics device installed in a vehicle, the telematics data including acceleration data; detect a putative collision event based on the acceleration data exceeding a predetermined acceleration threshold; identify a portion of the acceleration data associated with the putative collision event, the portion of the acceleration data spanning from a time prior to the putative collision event to a time subsequent to the putative collision event; identify at least one impulse in the portion of the acceleration data based on a predetermined jerk threshold; use a trained classifier on the at least one impulse to determine that the putative collision event is a collision event; and in response to determining the collision event, trigger at least one action responsive to the collision event.

In some embodiments, the trained classifier can be a trained k-nearest neighbor classifier.

In some embodiments, the trained classifier can be a trained decision tree classifier.

In some embodiments, the trained decision tree classifier can be a trained decision tree ensemble classifier.

In some embodiments, the trained decision tree classifier can be a trained gradient boosted decision tree classifier.

In some embodiments, the trained classifier can be used on a maximum magnitude of the at least one impulse.

In some embodiments, the trained classifier can be used on a duration of the at least one impulse.

In some embodiments, the trained classifier can be used on an area under of the curve of the at least one impulse.

In some embodiments, the trained classifier can be used on a deviation of the portion of the acceleration data associated with the putative collision event.

In some embodiments, the method can further involve operating the at least one processor to: smooth the portion of the acceleration data prior to identifying the at least one impulse.

In some embodiments, the at least one impulse can include a plurality of impulses and the trained classifier can be used on each impulse in the plurality of impulses.

In some embodiments, detecting the putative collision event can involve: determining whether the acceleration data exceeds a predetermined acceleration threshold for a duration exceeding a predetermined time threshold.

In some embodiments, identifying the at least one impulse can involve detecting a start and end to each impulse based on the predetermined jerk threshold.

In some embodiments, triggering the at least one action can involve transmitting at least one notification to at least one user associated with the vehicle.

In some embodiments, the telematics data can further include location data; and the trained classifier can be used on a portion of the location data associated with the putative collision event to determine that the putative collision event is a collision event.

In some embodiments, the location data can be GPS data.

In some embodiments, the at least one processor can be remotely located from the telematics device.

In some embodiments, the telematics device can include the at least one processor.

In some embodiments, triggering the at least one action can involve: transmitting a request to confirm whether the collision event occurred to a computing device associated with the vehicle; and receiving a response to the request confirming whether the collision event occurred.

In some embodiments, the method can further involve operating the at least one processor to: retrain the trained classifier based on the at least one impulse and the response.

In some embodiments, the trained classifier can be a first classifier; and the method can further involve operating the at least one processor to train a second classifier based on the at least one impulse and the response.

In some embodiments, the second classifier can be trained using a larger amount of training data as compared to the first classifier.

In some embodiments, the second classifier can be a neural network.

In accordance with a broad aspect, there is provided a system for detecting vehicle collisions. The system includes: at least one data store and at least one processor in communication with the at least one data store. The at least one data store is operable to store telematics data originating from a telematics device installed in a vehicle. The telematics data includes acceleration data. The at least one processor is operable to: receive the telematics data; detect a putative collision event based on the acceleration data exceeding a predetermined acceleration threshold; identify a portion of the acceleration data associated with the putative collision event, the portion of the acceleration data spanning from a time prior to the putative collision event to a time subsequent to the putative collision event; identify at least one impulse in the portion of the acceleration data based on a predetermined jerk threshold; use a trained classifier on the at least one impulse to determine that the putative collision event is a collision event; and in response to determining the collision event, trigger at least one action responsive to the collision event.

In some embodiments, the trained classifier can be a trained k-nearest neighbor classifier.

In some embodiments, the trained classifier can be a trained decision tree classifier.

In some embodiments, the trained decision tree classifier can be a trained decision tree ensemble classifier.

In some embodiments, the trained decision tree classifier can be a trained gradient boosted decision tree classifier.

In some embodiments, the trained classifier can be used on a maximum magnitude of the at least one impulse.

In some embodiments, the trained classifier can be used on a duration of the at least one impulse.

In some embodiments, the trained classifier can be used on an area under of the curve of the at least one impulse.

In some embodiments, the trained classifier can be used on a deviation of the portion of the acceleration data associated with the putative collision event.

In some embodiments, the at least one processor can be operable to: smooth the portion of the acceleration data prior to identifying the at least one impulse.

In some embodiments, the at least one impulse can include a plurality of impulses and the trained classifier can be used on each impulse in the plurality of impulses.

In some embodiments, detecting the putative collision event can involve: determining whether the acceleration data exceeds a predetermined acceleration threshold for a duration exceeding a predetermined time threshold.

In some embodiments, identifying the at least one impulse can involve, detecting a start and end to each impulse based on the predetermined jerk threshold.

In some embodiments, triggering the at least one action can involve transmitting at least one notification to at least one user associated with the vehicle.

In some embodiments, the telematics data can further include location data; and the trained classifier can be used on a portion of the location data associated with the putative collision event to determine that the putative collision event is a collision event.

In some embodiments, the location data can be GPS data.

In some embodiments, the at least one processor can be remotely located from the telematics device.

In some embodiments, the telematics device can include the at least one processor.

In some embodiments, triggering the at least one action can involve: transmitting a request to confirm whether the collision event occurred to a computing device associated with the vehicle; and receiving a response to the request confirming whether the collision event occurred.

In some embodiments, the at least one processor can be operable to: retrain the trained classifier based on the at least one impulse and the response.

In some embodiments, the trained classifier can be a first classifier; and the at least one processor can be operable to train a second classifier based on the at least one impulse and the response.

In some embodiments, the second classifier can be trained using a larger amount of training data as compared to the first classifier.

In some embodiments, the second classifier can be a neural network.

In accordance with a broad aspect, there is provided a method for training a classifier to detect vehicle collisions. The method involves operating at least one processor to: receive telematics data originating from a plurality of telematics devices installed in a plurality of vehicles, the telematics data including acceleration data; receive label data, the label data identifying a plurality of collision events, a plurality of non-collision events, and a portion of the telematics data associated with each collision event and non-collision event; for each portion of the telematics data, identify at least one impulse in a corresponding portion of the acceleration data based on a predetermined jerk threshold; for each portion of the telematics data associated with a collision event, select a single impulse to be associated with the collision event; and train a classifier to determine whether an event is a collision event based on an impulse associated with the event using the at least one impulse for each portion of the telematics data associated with a non-collision event and the single impulse for each portion of the telematics data associated with a collision event.

In some embodiments, the classifier can be a k-nearest neighbor classifier.

In some embodiments, the classifier can be a decision tree classifier.

In some embodiments, the classifier can be a decision tree ensemble classifier.

In some embodiments, the decision tree classifier can be a gradient boosted decision tree classifier.

In some embodiments, the classifier can be trained using a maximum magnitude of the at least one impulse for each portion of the telematics data associated with a non-collision event and a maximum magnitude of the single impulse for each portion of the telematics data associated with a collision event.

In some embodiments, the classifier can be trained using a duration of the at least one impulse for each portion of the telematics data associated with a non-collision event and a duration of the single impulse for each portion of the telematics data associated with a collision event.

In some embodiments, the classifier can be trained using an area under of the curve of the at least one impulse for each portion of the telematics data associated with a non-collision event and an area under the curve of the single impulse for each portion of the telematics data associated with a collision event.

In some embodiments, the classifier can be trained using a deviation of the acceleration data for each portion of the telematics data associated with a non-collision event and a deviation of the acceleration data for each portion of the telematics data associated with a collision event.

In some embodiments, the method can further involve operating the at least one processor to: smooth the corresponding portion of the acceleration data prior to identifying the at least one impulse.

In some embodiments, the at least one impulse can include a plurality of impulses and the classifier can be trained using the plurality of impulses for each portion of the telematics data associated with a non-collision event and the single impulse for each portion of the telematics data associated with a collision event.

In some embodiments, identifying the at least one impulse can involve, detecting a start and end to each impulse based on the predetermined jerk threshold.

In some embodiments, the telematics data can further include location data; and the classifier can be further trained using a corresponding portion of the location data.

In some embodiments, the location data can be GPS data.

In some embodiments, the at least one processor can be remotely located from the telematics device.

In some embodiments, the telematics device can include the at least one processor.

In accordance with a broad aspect, there is provided a system for training a classifier to detect vehicle collisions. The system includes: at least one data store operable to store telematics data and label data and at least one processor in communication with the at least one data store. The telematics data originates from a plurality of telematics devices installed in a plurality of vehicles. The telematics data includes acceleration data. The label data identifies a plurality of collision events, a plurality of non-collision events, and a portion of the telematics data associated with each collision event and non-collision event. The at least one processor is operable to: receive the telematics data; receive the label data; for each portion of the telematics data, identify at least one impulse in a corresponding portion of the acceleration data based on a predetermined jerk threshold; for each portion of the telematics data associated with a collision event, select a single impulse to be associated with the collision event; and train a classifier to determine whether an event is a collision event based on an impulse associated with the event using the at least one impulse for each portion of the telematics data associated with a non-collision event and the single impulse for each portion of the telematics data associated with a collision event.

In some embodiments, the classifier can be a k-nearest neighbor classifier.

In some embodiments, the classifier can be a decision tree classifier.

In some embodiments, the classifier can be a decision tree ensemble classifier.

In some embodiments, the decision tree classifier can be a gradient boosted decision tree classifier.

In some embodiments, the classifier can be trained using a maximum magnitude of the at least one impulse for each portion of the telematics data associated with a non-collision event and a maximum magnitude of the single impulse for each portion of the telematics data associated with a collision event.

In some embodiments, the classifier can be trained using a duration of the at least one impulse for each portion of the telematics data associated with a non-collision event and a duration of the single impulse for each portion of the telematics data associated with a collision event.

In some embodiments, the classifier can be trained using an area under of the curve of the at least one impulse for each portion of the telematics data associated with a non-collision event and an area under the curve of the single impulse for each portion of the telematics data associated with a collision event.

In some embodiments, the classifier can be trained using a deviation of the acceleration data for each portion of the telematics data associated with a non-collision event and a deviation of the acceleration data for each portion of the telematics data associated with a collision event.

In some embodiments, the at least one processor can be operable to: smooth the corresponding portion of the acceleration data prior to identifying the at least one impulse.

In some embodiments, the at least one impulse can include a plurality of impulses and the classifier can be trained using the plurality of impulses for each portion of the telematics data associated with a non-collision event and the single impulse for each portion of the telematics data associated with a collision event.

In some embodiments, identifying the at least one impulse can involve, detecting a start and end to each impulse based on the predetermined jerk threshold.

In some embodiments, the telematics data can further include location data; and the classifier can be further trained using a corresponding portion of the location data.

In some embodiments, the location data can be GPS data.

In some embodiments, the at least one processor can be remotely located from the telematics device.

In some embodiments, the telematics device can include the at least one processor.

In accordance with a broad aspect, there is provided a non-transitory computer readable medium having instructions stored thereon executable by at least one processor to implement any one of the methods herein.

BRIEF DESCRIPTION OF THE DRAWINGS

Several embodiments will be described in detail with reference to the drawings, in which.

Figure 1:
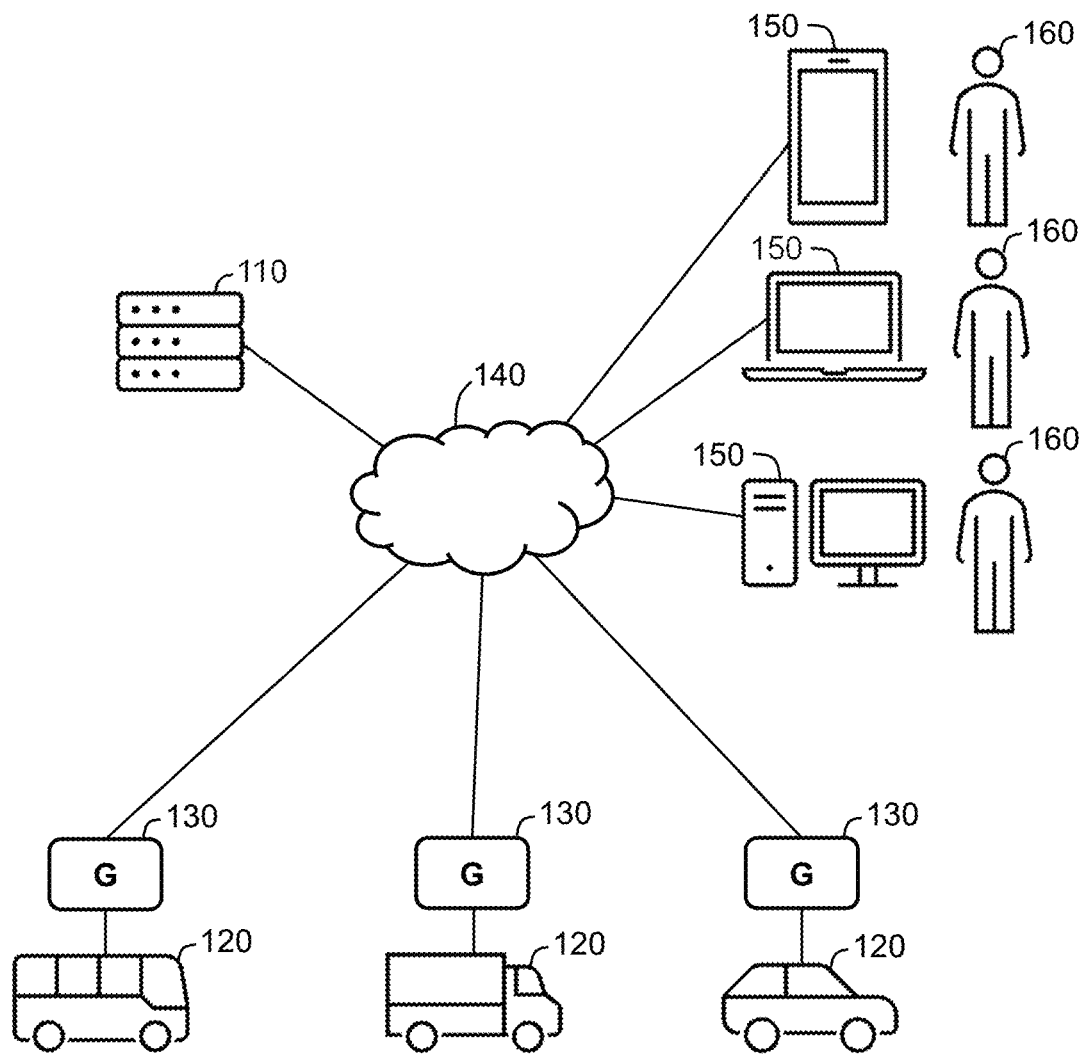
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example asset management system 110 for managing a plurality of assets equipped with a plurality of telematics devices 130. In operation, the telematics devices 130 can gather various data associated with the assets (i.e., telematics data) and share the telematics data with the asset management system 110. The asset management system 110 can be remotely located from the telematics devices 130 and the assets.

For ease of exposition, various examples will now be described in which the assets are vehicles 120 and the asset management system 110 is referred to as a fleet management system 110. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120, such as, but not limited to, vehicle tracking devices. Alternatively, the telematics devices 130 can be integrated or embedded components that are integral with the vehicles 120, such as, but not limited to, telematic control units (TCUs). The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire pressure data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, reporting, and alerts. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using a cloud computing platform, such as Google Cloud Platform™ or Amazon Web Services™. In other embodiments, the fleet management system 110 may be implemented using one or more dedicated computer servers.

Figure 2:
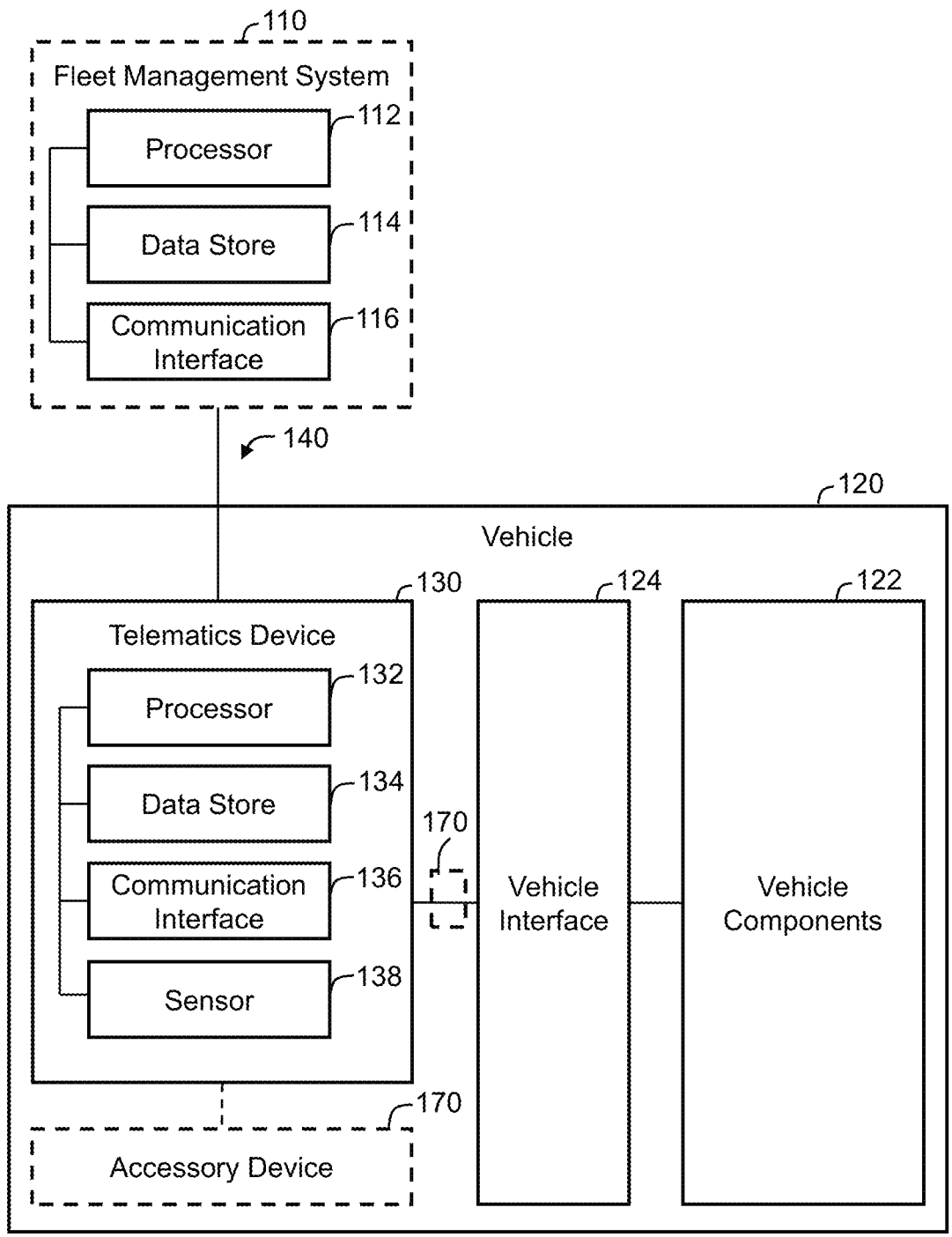
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120.

As shown, the fleet management system 110 can include one or more processors 112, one or more data stores 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data stores 114 to implement various methods described herein. For example, the processors 112 may process various telematics data collected by the fleet management system 110 from the telematics device 130.

The data stores 114 can store various data for the fleet management system 110. The data stores 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data stores 114 may include volatile memory, non-volatile memory, or a combination thereof. The data stores 114 may include non-transitory computer readable media. The data stores 114 can store various computer instructions, programs, and/or software that can be executed by the processors 112 to implement various methods described herein. The data stores 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data stores 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data stores 134. For example, the processors 132 can process various telematics data gathered from the vehicle components 122 or the sensors 138.

The data stores 134 can store various data for the telematics device 130. Like the data stores 114 of the fleet management system 110, the data stores 134 of the telematics device 130 can be implemented using any suitable data storage devices or systems. The data stores 134 can store various computer instructions, programs, and/or software that can be executed by the processors 132. The data stores 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, ODB-II (on-board diagnostics) ports and/or CAN (controller area network) buses. The vehicle interfaces 124 can be used by the telematics device 130 to gather telematics data from the vehicle components 122. For example, the communication interfaces 136 of the telematics device 130 can be connected to the vehicle interfaces 124 to communicate with the vehicle components 122. In some cases, an accessory device 170, such as a wire harness, can provide the connection between the communication interface 136 and the vehicle interface 124.

Figure 3:
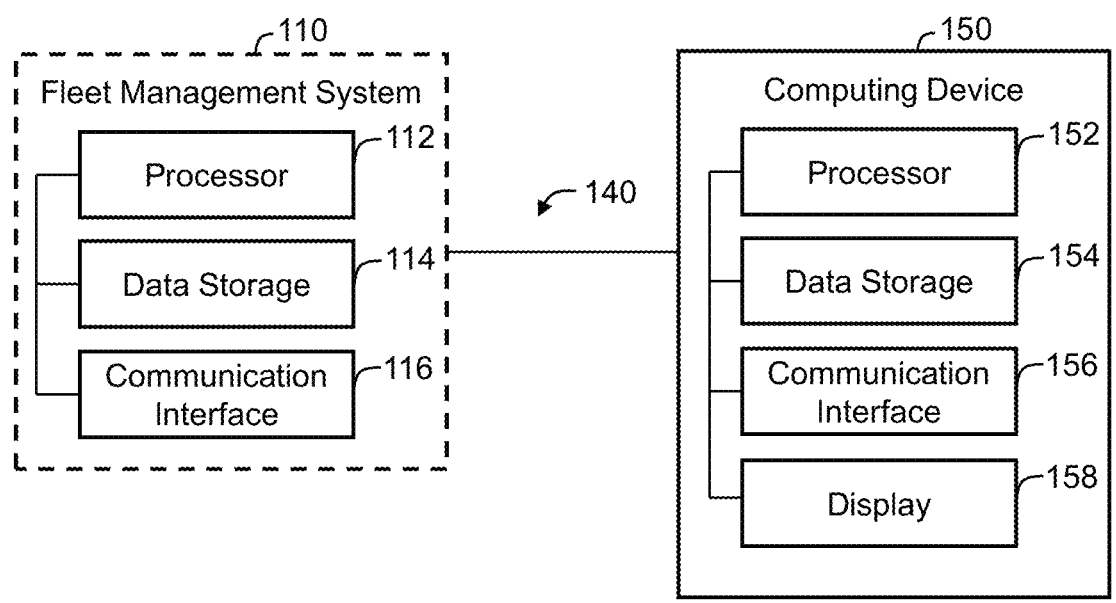
FIG. 3 is a block diagram of an example computing device interacting with an example fleet management system, in accordance with an embodiment.

Reference will now be made to FIG. 3 to further explain the operation of the fleet management system 110 and computing devices 150. In the illustrated example, the fleet management system 110 in communication with a computing device 150. As shown, the computing device 150 also can include one or more processors 152, one or more data stores 154, and one or more communication interfaces 156. Additionally, the computing device 150 can include one or more displays 158. Each of these components can communicate with each other. Each of these components may be combined into fewer components or divided into additional subcomponents.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data stores 154 to implement various methods described herein. For example, the processors 152 may process various telematics data received from the fleet management system 110 and/or the telematics device 130.

The data stores 154 can store various data for the computing device 150. Like the data stores 114 of the fleet management system 110 and the data stores 134 of the telematics device 130, the data stores 154 of the computing device 150 can be implemented using any suitable data storage devices or systems. The data stores 154 can store various computer instructions, programs, and/or software that can be executed by the processor 152 to implement various methods described herein. The data stores 154 may store various telematics data received from the fleet management system 110 and/or the telematics device 130.

The communication interfaces 156 can enable communication between the computing device 150 and other devices or systems, such as the fleet management system 110. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150. For example, the communication interfaces 116 may be used to retrieve telematics data from the fleet management system 110.

The displays 158 can visually present various data for the computing device 150. The displays 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The displays 158 can be an integrated component that is integral with the computing device 150 or a standalone device that is removably connected to the computing device 150. The displays 158 can present various user interfaces for various computer applications, programs, and/or software associated with various methods described herein. For example, the displays 158 may display various visual representations of the telematics data.

Figure 4:
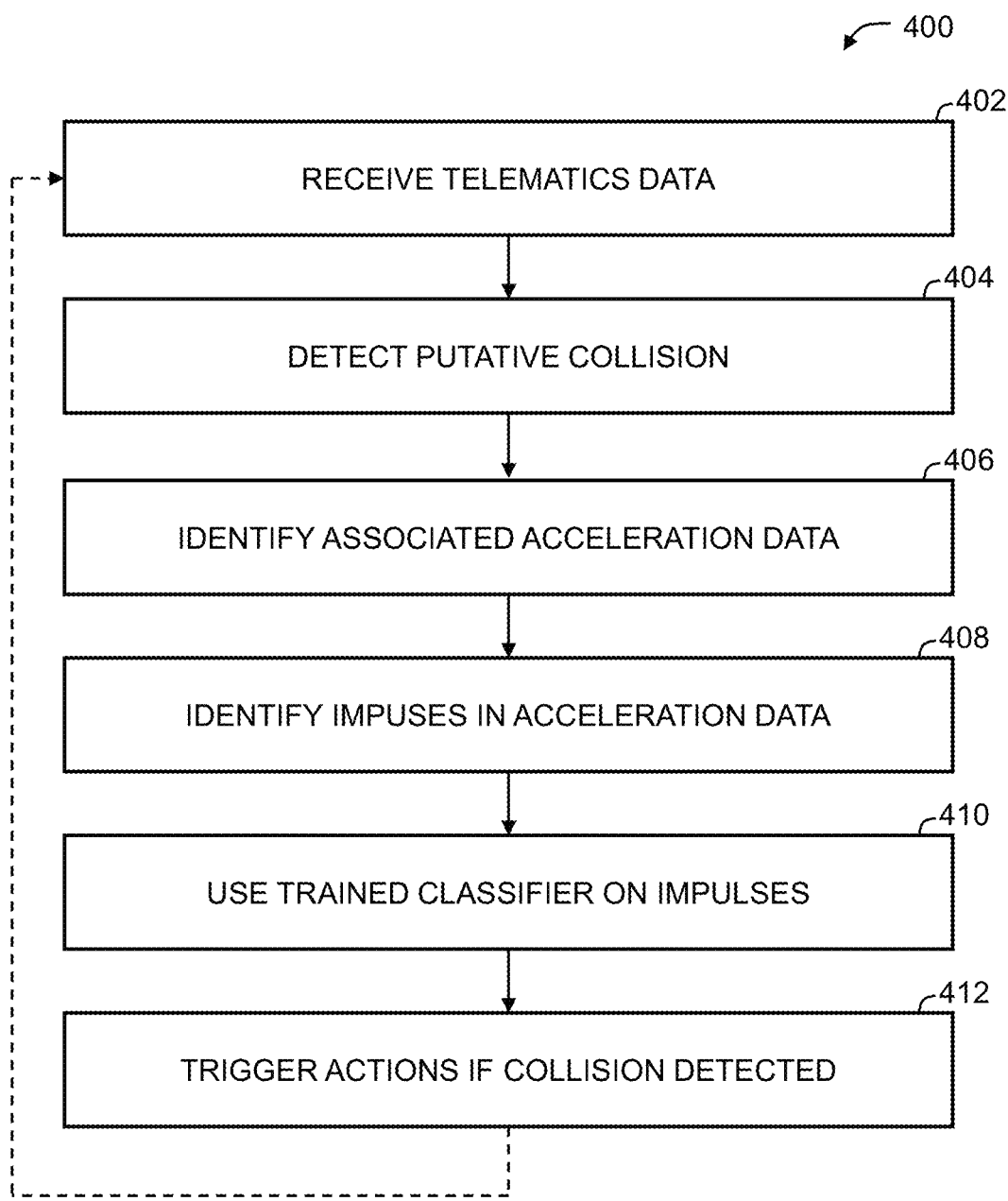
FIG. 4 is a flowchart of an example method for detecting vehicle collisions, in accordance with an embodiment.

Referring now to FIG. 4, there is shown an example method 400 for detecting vehicle collisions. The collision detection method 400 can be implemented at the fleet management system 110 (e.g., by at least one processor 112 executing instructions stored on at least one data store 114). An advantage of implementing at least a portion of the collision detection method 400 at the fleet management system 110 (i.e., remote from telematics devices 130 and computing devices 150) is that less processing may be executed at the telematics devices 130 and/or computing devices 150. Hence, the hardware complexity and cost of the telematics devices 130 and/or computing devices 150 can be reduced. Furthermore, it may be easier to update and/or modify software running on the fleet management system 110 as compared to the telematics devices 130 and/or computing devices 150. However, it should be appreciated that the collision detection method 400 may also be implemented, at least in part, using one or more telematics devices 130, one or more computing devices 150, or a combination thereof in some embodiments. That is, the collision detection method 400 may be implemented by any of the one or more processors 112, 132, 152 executing instructions stored on any of the one or more data stores 114, 134, 154.

The collision detection method 400 generally involves using a trained classifier to detect collisions based on various features extracted from telematics data originating from the telematics devices 130. The trained classifier is a machine learning or artificial intelligence model that the inventors recognized and realized could more effectively detect collisions compared to conventional approaches, which are typically heuristics-based. The inventors recognized and realized that by selecting specific features of the telematics data, such as impulses in acceleration data, particular models could be utilized to effectively detect collisions, even if the model was trained using a relatively small dataset. The inventors also recognized and realized that the collision detection method 400 could be used to collect additional training data, which could be used to retrain the classifier and/or train other classifiers, including more complex classifiers requiring larger amounts of training data. The inventors recognized and realized that this could improve the speed and accuracy of collision detection, and could therefore help to remedy and minimize the repercussions of vehicle collisions.

At 402, telematics data can be received. The telematics data can be received from or by a telematics device 130, fleet management system 110, and/or computing device 150. For example, the telematics data can be received from any of the one or more data stores 114, 134, 154. The telematics data can originate from a telematics device 130 installed in a vehicle 120, for example, being collected or generated by the telematics device 130 during operation of the vehicle 120. As described herein, the telematics data can include various information pertaining to the operation of the vehicle 120. For example, the telematics data may include acceleration data representing the acceleration of the vehicle 120 at various points in time during a trip performed by the vehicle 120. The acceleration data can originate from an accelerometer of the telematics device 130 and/or the vehicle 120. As another example, the telematics data may include location data (e.g., GPS data) representing the location of the vehicle 120 at various points in time during a trip performed by the vehicle 120. The location data can originate from a GPS receiver of the telematics device 130 and/or the vehicle 120.

Figure 5:
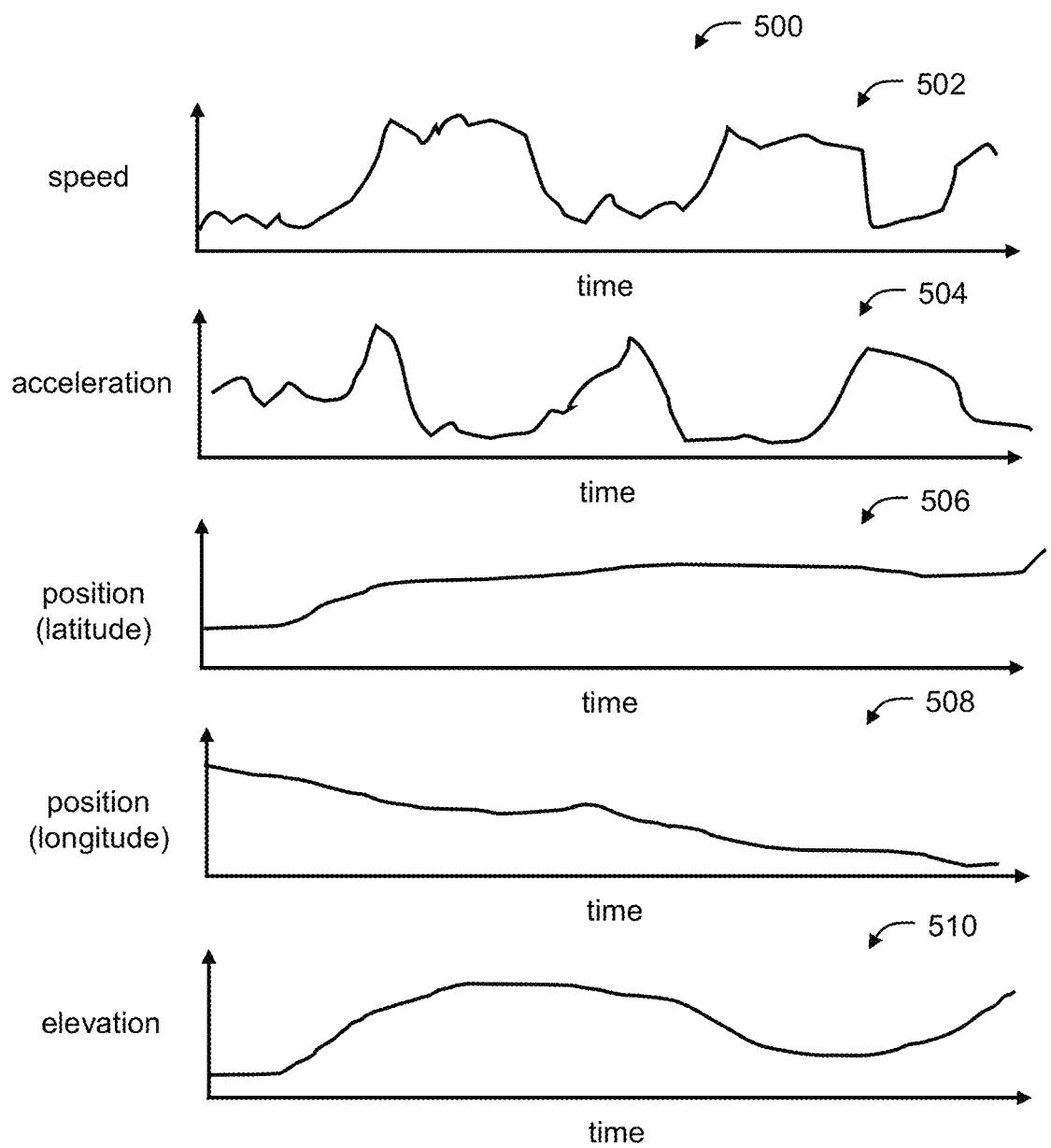
FIG. 5 is a plurality of graphs of example telematics data, in accordance with an embodiment.

FIG. 5 shows various examples of telematics data 500 that can be received at 402. In the illustrated example, the telematics data 500 includes various time series of data points corresponding to various vehicle parameters. Each data point can represent the value of a particular vehicle parameter at a given time. In the illustrated example, the telematics data includes speed data 502, acceleration data 504, latitude data 506, longitude data 508, and elevation data 510.

The speed data 502 can represent the velocity or rate of change of change of position with respect to time of the vehicle 120. The speed data 502 can be measured by a speed sensor or speedometer of the vehicle 120 and/or telematics device 130 or derived from position data, such as the latitude data 506, longitude data 508, and/or elevation data 510.

The acceleration data 504 can represent the rate of change of velocity with respect to time of the vehicle 120. The acceleration data 504 can be measured by an acceleration sensor or accelerometer of the vehicle 120 and/or telematics device 130 or derived from position data, such as the latitude data 506, longitude data 508, and/or elevation data 510, and/or the speed data 502.

The latitude data 506, longitude data 508, and elevation data 510 can generally represent the location or position of the vehicle 120. More specifically, the latitude data 506 can describe the north-south position of the vehicle 120, the longitude data 508 can describe the east-west position of the vehicle 120, and the elevation data 510 can describe the vertical position or height of the vehicle 120. The latitude data 506, longitude data 508, and elevation data 510 can be measured by a position or location sensor of the vehicle 120 and/or telematics device 130, such as a GPS (Global Positioning System) receiver.

It should be appreciated the telematics data 500 received at 402 is not limited to the examples shown in FIG. 5. That is, more, fewer, or different types of telematics data 500 may be received at 402. In some embodiments, the telematics data 500 may include only a single vehicle parameter, such as acceleration data 504. In other embodiments, the telematics data 500 may include other or additional vehicle parameters, including those not shown in FIG. 5. Generally, the telematics data 500 can vary depending on the type of trained classifiers employed by the collision detection method 400 and the telematics data 500 can include any type of data originating from the telematics device 130 that is suitable or otherwise compatible with the classifier.

At 404, a putative collision event can be detected. The putative collision event can represent a potential, probable, or plausible, but unconfirmed, collision experienced by the vehicle 120. The putative collision event can be detected based on acceleration data 504 exceeding a predetermined acceleration threshold. A sudden acceleration or deceleration of the vehicle 120 can indicate or suggest that the vehicle 120 has been involved in a collision. The predetermined acceleration threshold can represent an acceleration value above which a collision is presumed or suspected to have occurred.

The predetermined acceleration threshold can be determined empirically and/or heuristically and can vary, depending on the desired sensitivity of detection. A higher acceleration threshold may produce fewer false positives arising from high acceleration values that are not associated with a collision, for example, caused by potholes, speed bumps, and/or harsh driving. However, a higher acceleration threshold may also result in more false negatives arising from low impact collisions having low acceleration values. Conversely, a lower acceleration threshold may produce fewer false negatives, but may also result in more false positives. Examples of acceleration threshold values may include 0.5G, 1G, 1.5G, 2G, 2.5G, 3G, etc. where G is 9.81 m/s$^2$, the acceleration due to Earth's gravity. Various other acceleration thresholds may be suitable.

In some embodiments, the putative collision event can be detected based on the acceleration data 504 exceeding the predetermined acceleration threshold for a duration exceeding a predetermined time threshold. In other words, the duration or length of time of the acceleration data 504 exceeding the predetermined acceleration threshold can also be evaluated when determining whether a putative collision event has occurred. Like the acceleration threshold, the predetermined time threshold can be determined empirically and/or heuristically and can vary, depending on the desired sensitivity of detection. Longer time periods may reduce false positives arising from rapid, short-duration accelerations that are unrelated to a collision, for example, caused by potholes, speed bumps, and/or harsh driving. On the other hand, shorter time periods may reduce false positives arising from rapid, short-duration accelerations that are in fact related with a collision. Examples of time threshold durations may include 1 s, 1.5 s, 2 s, 2.5 s, 3 s, 3.5 s, etc. Various other time thresholds may be suitable.

Figure 6:
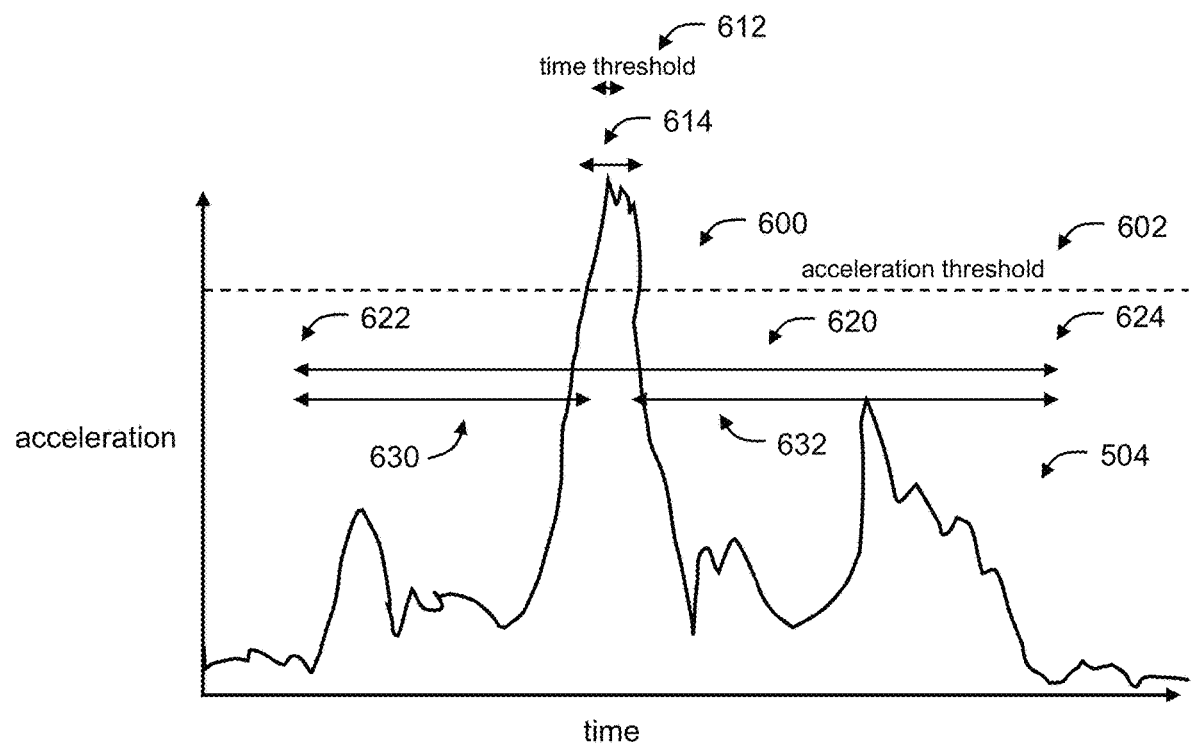
FIG. 6 is a graph of example acceleration data containing an example putative collision event, in accordance with an embodiment.

FIG. 6 shows an example of acceleration data 504 that can be used to detect a putative collision event 600 at 404. In the illustrated example, the acceleration data 504 exceeds a predetermined acceleration threshold 602 for a duration 614 exceeding a predetermined time threshold 612. Accordingly, a putative collision event 600 can be detected in the illustrated example. As will be appreciated, the acceleration threshold 602 and time threshold 612 can be tuned based on the desired sensitivity of detection.

An advantage of detecting putative collision events 600 at 404, prior to using a trained classifier, is that less data may be processed by the classifier. The inventors recognized and realized that by detecting of potential, probable, or plausible collision events 600, the trained classifier could be used on smaller portions of acceleration data 504. This can improve the efficiency and performance of the classifier. The inventors also recognized and realized that initial detection of putative collision events 600 could reduce the number of false positives detected by the trained classifier.

At 406, a portion of the acceleration data 504 associated with the putative collision event 600 can be identified. The portion of the acceleration data 504 can span from a time prior to the putative collision event 600 to a time subsequent to the putative collision event 600. That is, the portion of the acceleration data 504 can include acceleration data 504 from before, after, and during the putative collision event 600. Put another way, the portion of the acceleration data 504 can include data outside of or in addition to the acceleration data 504 exceeding the predetermined acceleration threshold for the duration exceeding a predetermined time threshold (i.e., the acceleration data 504 used to detect the putative collision event 600).

FIG. 6 shows an example portion 620 of the acceleration data 504 associated with the putative collision event 600. As shown, the portion 620 of the acceleration data spans from a time 622 prior to the putative collision event 600 to a time 624 subsequent to the putative collision event 600. Also, the portion 620 of the acceleration data 504 includes acceleration data 504 outside of or in addition to the acceleration data used to detect the putative collision event 600.

The length of the portion 620 of the acceleration data 504 can be defined based on one or more predetermined time periods. For example, a first predetermined time period 630 can specify an amount of time prior to the putative collision event 600 and a second predetermined time period 632 can specify an amount of time after the putative collision event 600. The predetermined time periods 630, 632 can be same length or different lengths. The predetermined time periods 630, 632 can be determined empirically and/or heuristically, and can vary depending on the trained classifier. Examples of predetermined time periods may include 1 s, 1.5 s, 2 s, 2.5 s, 3 s, 3.5 s, etc. Various other time periods may be suitable.

At 408, at least one impulse can be identified in the portion 620 of the acceleration data 504. Each impulse can be defined by a rapid, transient change in acceleration magnitude, such as a rapid increase or decrease from a baseline acceleration value, followed by a rapid return to the baseline acceleration value. The at least one impulse can be identified based on jerk, or the rate of change of acceleration with respect to time. A predetermined jerk threshold can be used to identify the at least one impulse. For example, the predetermined jerk threshold can be used detect the start and end of each impulse. The start and end of each impulse can have jerk values that exceed the predetermined jerk threshold, since the start and end of an impulse generally contain the greatest jerk values in the impulse. Since the start and end of an impulse bound and define the impulse, they can be used to identify or detect the impulse. The jerk threshold can be determined empirically and/or heuristically, and can vary depending on the desired identification sensitivity. Examples of jerk thresholds may include 0.25 G/s, 0.5 G/s, 1 G/s, 1.25 G/s, 1.5 G/s, etc. where G is 9.81 m/s$^2$, the acceleration due to Earth's gravity. Various other jerk thresholds may be suitable.

Figure 7:
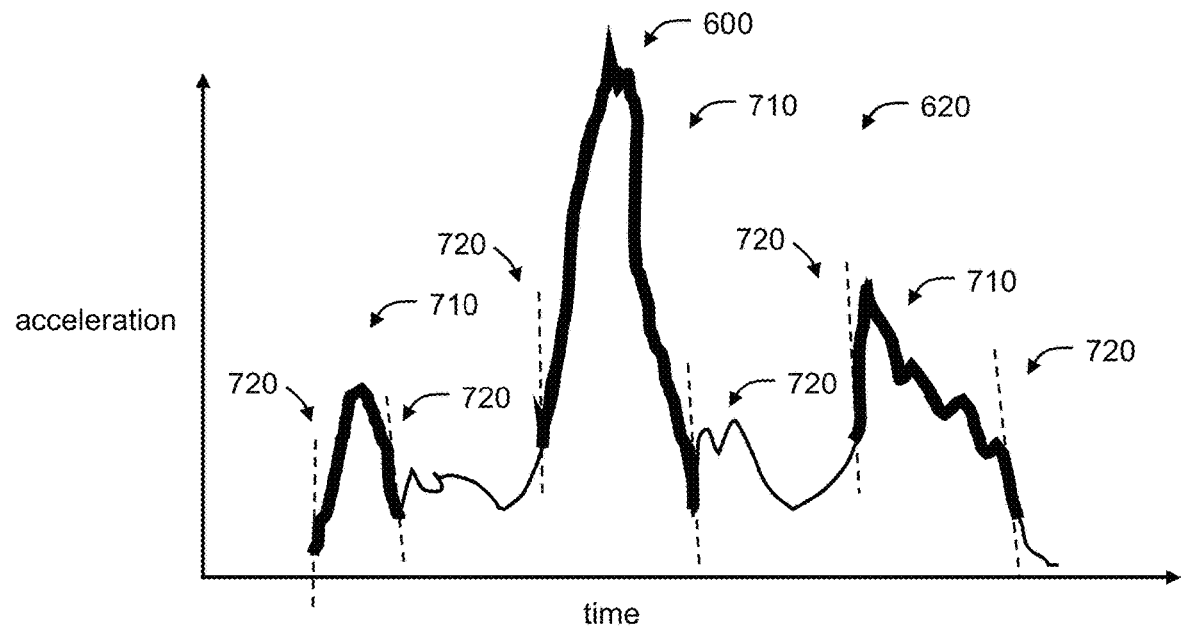
FIG. 7 is a graph of example acceleration data containing example impulses, in accordance with an embodiment.

FIG. 7 shows a portion 620 of acceleration data 504 associated with a putative collision event 600. As shown, the portion 620 of the acceleration data 620 can contain one or more impulses 710. The impulses 710 can be detected based on jerk, or the rate of change of the acceleration data 504 with respect to time. More specifically, the impulses 710 can be detected by detecting the start and end 720 of each impulse 710. In the illustrated example, the jerk at the start and end 720 of each impulse 710 are indicated. The start and end 720 of each impulse 710 can be detected by detecting that the indicated jerk values exceed a predetermined jerk threshold.

In the illustrated example, three impulses 710 are identified in the portion 620 of the acceleration data 504 associated with the putative collision event 600. However, it should be appreciated that the portion 620 of the acceleration data 504 may contain fewer or additional impulses 710 and any number of impulses 710 may be identified. In some cases, the portion 620 of the acceleration data 504 may only contain a single impulse 710. In other cases, the portion 620 of the acceleration data 504 may contain a plurality of impulses 710.

In some embodiments, the portion 620 of the acceleration data 504 associated with the putative collision event 600 can be smoothed prior to detecting the at least one impulse 710. Smoothing the acceleration data 504 prior to impulse detection can help to remove false positives arising from noisy acceleration data. However, over-smoothing may increase false positives by creating digital artifacts or increase false negatives by eliminating actual or real impulses 710. The type and amount of smoothing can be determined empirically and/or heuristically and can vary. Various smoothing algorithms, separately or in combination, may be used, such as, but not limited to, moving averages, LOWESS (locally weighted scatterplot smoothing), Savitzky-Golay filtering, kernel smoothing, exponential smoothing, running medians, Fourier transforms, wavelet smoothing, etc.

At 410, a trained classifier can be used on the at least one impulse 710 to determine whether the putative collision event 600 is a collision event. The trained classifier may be used on each impulse 710 in the at least one impulse or a subset of the at least one impulse 710. In some cases, the trained classifier may be used on a single impulse 710 in the at least one impulse 710. For example, the trained classifier may be used on the largest impulse 710. In other cases, the trained classifier may be used on every impulse 710.

Various types of models can be trained to classify putative collision events 600, including, but not limited to, machine learning or artificial intelligence models. The inventors recognized and realized that machine learning or artificial intelligence models could potentially be more effective at collision detection compared to traditional heuristics-based approaches for several reasons. First, machine learning models can automatically discover complex patterns and relationships within data that may not be easily identified by human-designed heuristics. Second, machine learning models can be more easily scaled to handle larger or more complex datasets. Third, machine learning models may be better at generalizing unseen data based on underlying patterns, whereas heuristics can often only handle specific scenarios. Fourth, machine learning models can be retrained as more data becomes available, allowing them to adapt and improve over time. Finally, machine learning models may potentially reduce human bias.

The classifier may be trained using supervised, unsupervised, semi-supervised, reinforcement, or other types of learning. Various models may be used, separately or in combination, such as, but not limited to, artificial neural networks, decision trees, support-vector machines, nearest neighbors, linear regression, logistical regression, Bayesian networks, random forests, genetic algorithms, ensemble models, and the like. In general, the classifier can be any model that is trained to determine whether an impulse 710 corresponds a collision event, without being explicitly programmed to do so. It should be appreciated that, in some embodiments, the classifier can be a regressor that predicts a probability of collision. The probability of collision can then be thresholded to determine whether the putative collision event is a collision event or a non-collision event.

In some embodiments, the trained classifier is a trained k-nearest neighbor classifier. K-nearest neighbors is a supervised machine learning algorithm that makes predictions based on proximity. A k-nearest neighbors classifier determines classification based a majority vote of the "k" closest training examples. The value of k can vary, depending on desired variance and bias, and can be determined empirically and/or heuristically. An advantage of using k-nearest neighbors is that the model can require a relatively small amount of training data, as compared to other types of machine learning or artificial intelligence models. The inventors recognized and realized that labeled data pertaining to collisions can be difficult to obtain. Collisions generally do not occur frequently, and when they do occur, drivers and fleet managers can be hesitant to report collisions. Collision data that is readily available is often unreliable or inaccurate. The inventors recognized and realized that a k-nearest neighbors classifier could accurately classify collisions using a limited training dataset.

Figure 8:
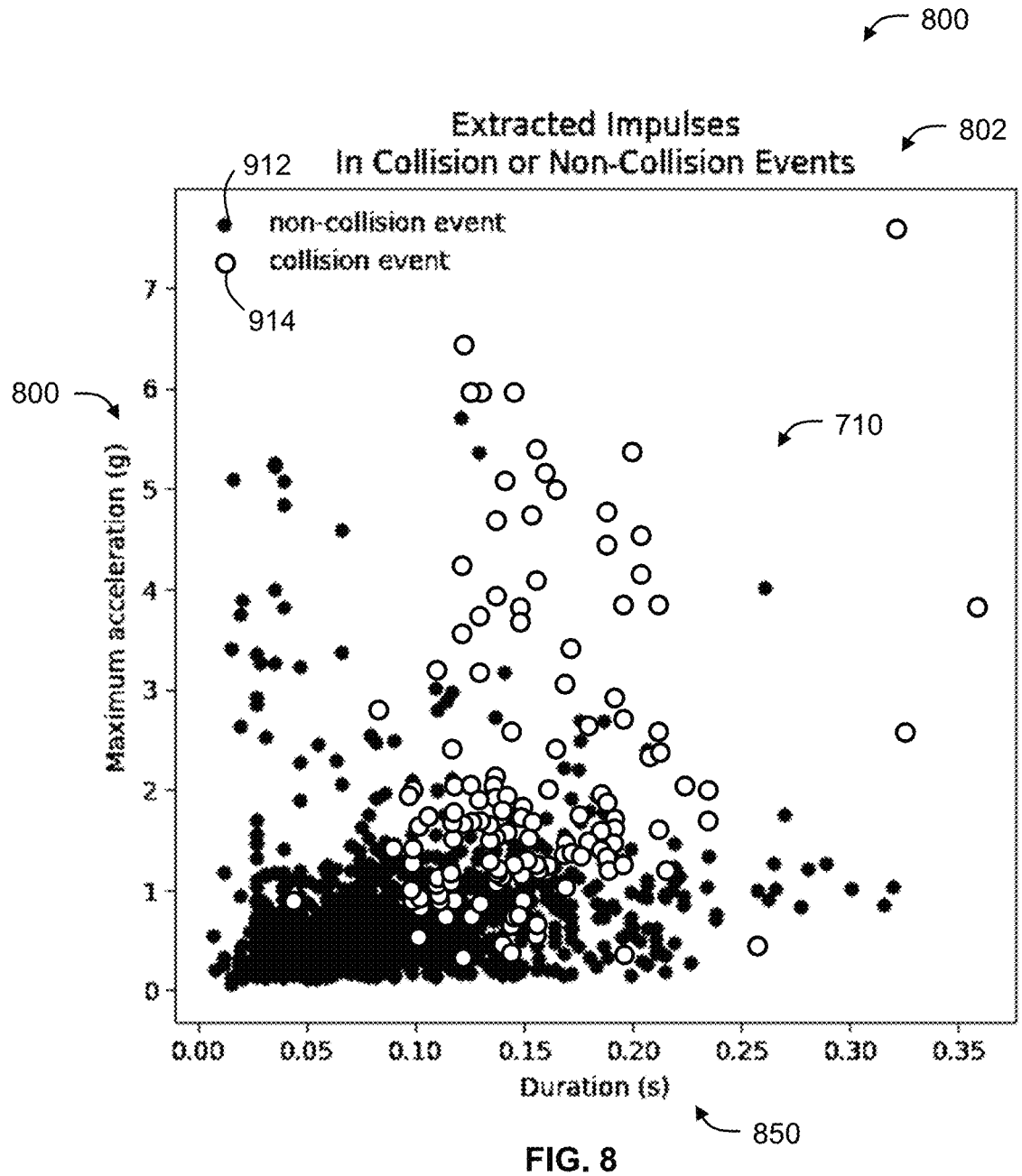
FIG. 8 is a graph of an example training dataset for a k-nearest neighbor classifier, in accordance with an embodiment.

FIG. 8 shows an example k-nearest neighbor classifier 900 that can be used at 410. As shown, the k-nearest neighbor classifier 900 uses a labeled training dataset 902. The labeled training dataset includes a plurality of training impulses that are labeled as non-collision events 912 and a plurality of training impulses that are labeled as collision events 914. In operation, the k-nearest neighbors classifier 900 assigns impulses 710 to the class that is most common among its k-nearest neighbours in the labeled training dataset 902. That is, an impulse 710 is classified as a collision event if the majority of its k-nearest neighbors are labeled as collision events 914. Likewise, an impulse 710 is classified as a non-collision event of the majority of its k-nearest neighbors are labeled as non-collision events 912. A putative collision event 600 can be classified as a collision event if any of the impulses 710 is classified as a collision event. A putative collision event can be classified as a non-collision event if all of the impulses 710 are classified as a non-collision event.

Figure 9A:
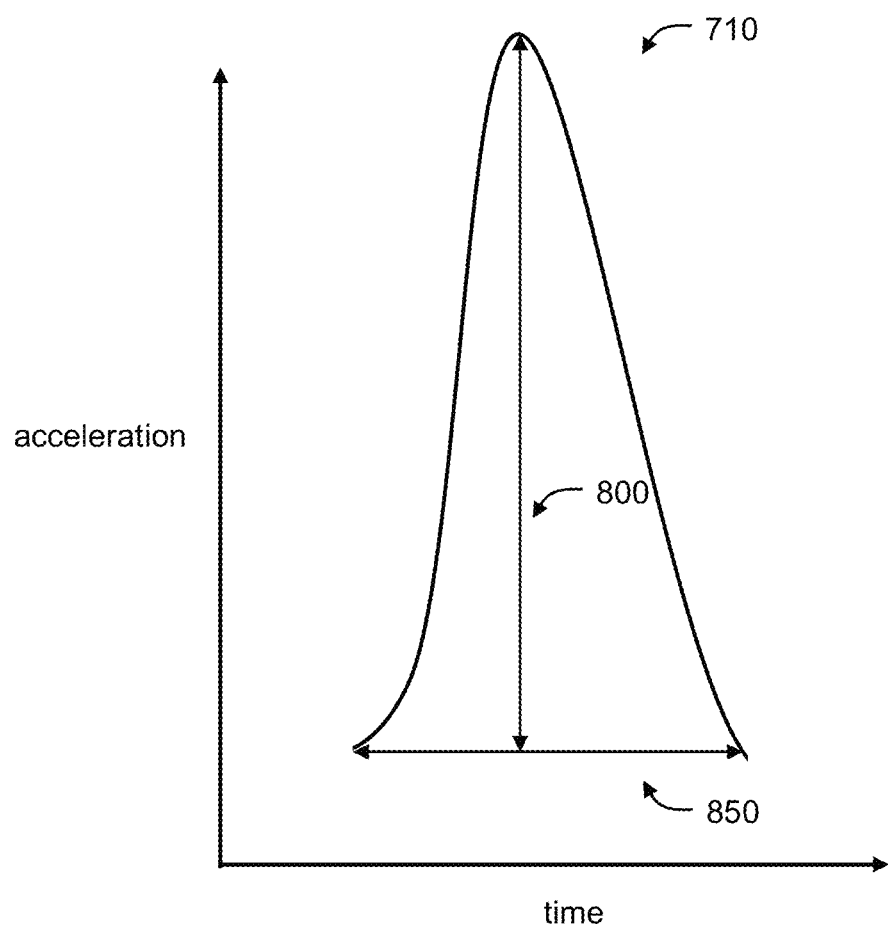
FIG. 9A is a graph of an example impulse, in accordance with an embodiment.

In the illustrated example, the k-nearest neighbor classifier 900 classifies impulses 710 based on the maximum magnitude 800 and duration 850 of the impulses 710. The maximum magnitude 800 of an impulse 710 can define the peak or max acceleration value of the impulse 710 and represent the intensity of the impulse 710. The duration of the impulse 850 can represent the width or time extent or duration of an impulse 710. FIG. 9A shows an example illustration of an impulse 710 and its maximum magnitude 800 and duration 850. The inventors recognized that the maximum magnitude 800 and duration 850 of impulses 710 were features that could be effectively used by a classifier to distinguish between collision and non-collision events. Generally, the larger and longer the impulse 710 is, the more likely a collision has occurred. Conversely, the smaller and shorter an impulse 710 is, the less likely a collision has occurred.

It should be appreciated that the trained classifier may classify putative collision events 600 based on additional or other features, or other combinations of features, in some embodiments. In general, any feature extracted from the telematics data, including other features that may be extracted from the acceleration data 504, may be used by the trained classifier to determine whether the putative collision event 600 is a collision event. In some cases, some or all of the features may be normalized or otherwise scaled to improve the accuracy of the classifier.

Figure 9B:
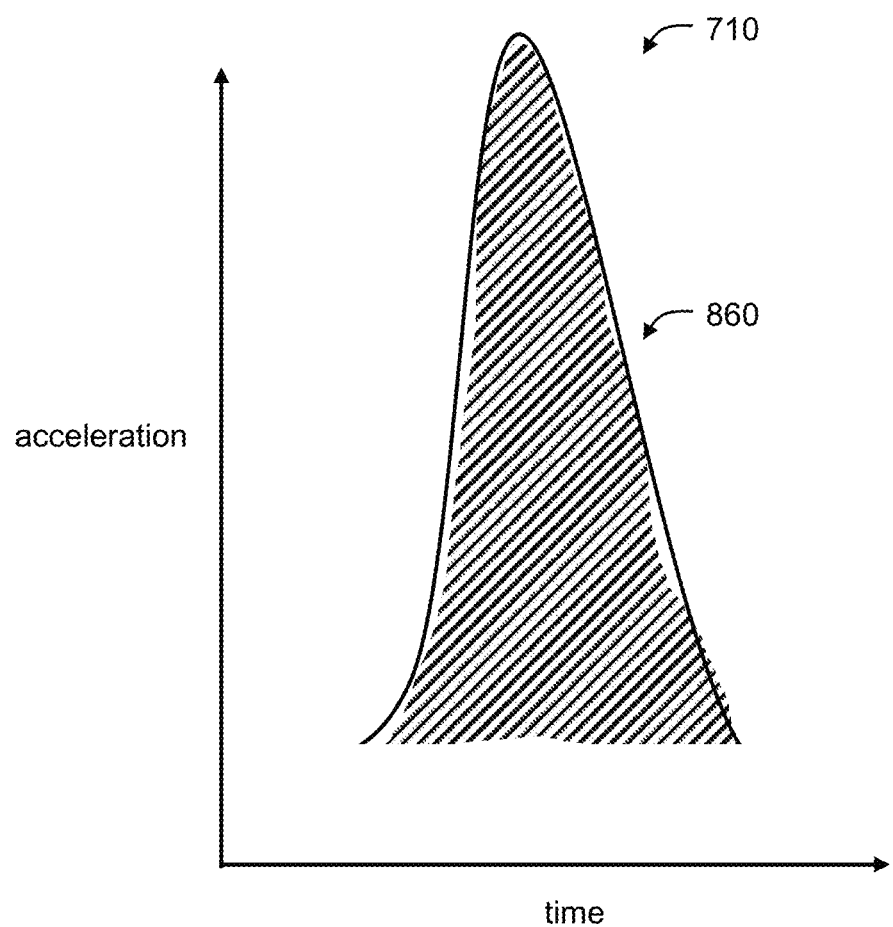
FIG. 9B is a graph of an example impulse, in accordance with an embodiment.

In some embodiments, the trained classifier may use an area under the curve of an impulse 710 to classify the impulse 710. In other words, the trained classifier may use an integral of the impulse 710. The area under the curve of the impulse 710 can represent the intensity and duration of the putative collision event 600. FIG. 9B shows an example impulse 710 and the area under the curve 860 of the impulse 710. The inventors recognized and realized that the area under the curve of an impulse 710 could be effectively used by a classifier to distinguish between collision and non-collision events. Generally, the larger the area of the impulse 710 is, the more likely a collision has occurred. Conversely, the smaller the area of an impulse 710 is, the less likely a collision has occurred.

Figure 9C:
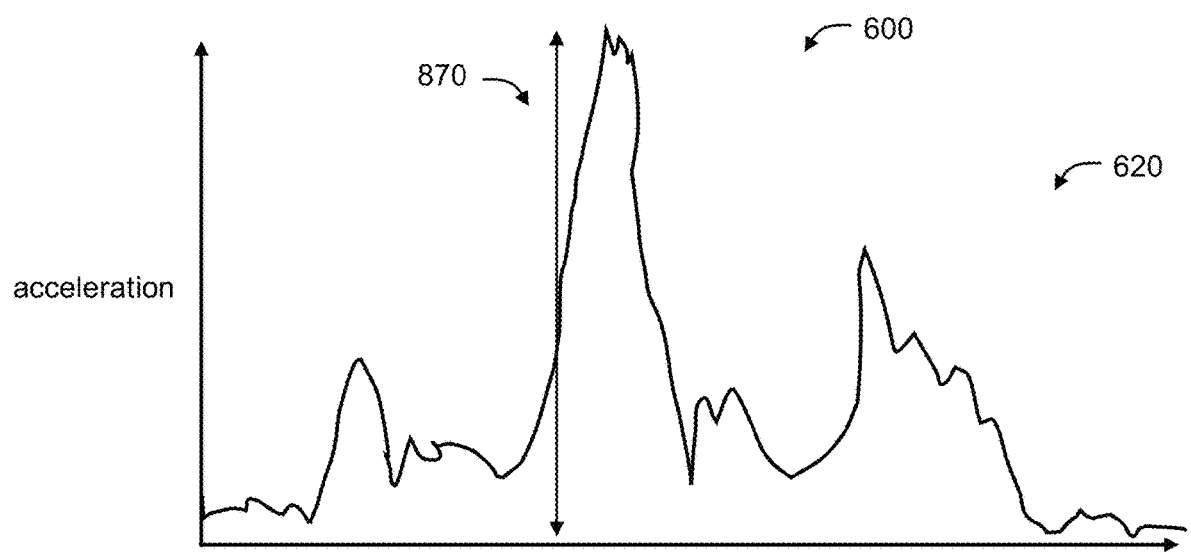
FIG. 9C is a graph of example acceleration data, in accordance with an embodiment.

In some embodiments, the trained classifier may classify a putative collision event 600 based on a deviation of the portion 620 of acceleration data 504 associated with the putative collision event 600. The deviation of the acceleration data 504 can represent the dispersion, variability, scatter, or spread of the acceleration data 504. For example, the deviation may be a range, standard deviation, variance, etc. The inventors recognized and realized that the deviation of acceleration data could be effectively used by a classifier as a feature to distinguish between collision and non-collision events. Generally, the smaller the deviation is, the more likely an actual collision has occurred. Conversely, the larger the deviation is, the less likely an actual collision has occurred, and the more likely there is noise or other unwanted or erroneous data. In some cases, the deviation can include the number of times the acceleration data 504 crosses a particular axis or zero point. In some cases, the deviation can include the number of times the acceleration data 504 exceeds the predetermined acceleration threshold. FIG. 9C shows an example portion 620 of acceleration data 504 associated with a putative collision event 600 having deviation 870.

In some embodiments, the trained classifier may be used on a portion of location data (such as latitude 506, longitude 508 or elevation data 510) associated with the putative collision event 600. The inventors recognized and realized that location data may be used as a feature by the classifier to distinguish between collision events (where a vehicle 120 is likely to come to a stop) from non-collision events (where a vehicle 120 is unlikely to come to a stop). In some embodiments, the location data used by the classifier can be an indication of whether the vehicle 120 came to a stop subsequent to the putative collision event 600.

It should be appreciated that various vectors (e.g., velocity, acceleration, impulse, jerk, etc.) described herein may refer to a net vector or a component vector. That is, various vectors described herein may refer to an overall vector or a vector in a particular direction. For example, the acceleration of a vehicle 120 may, in some cases, refer to acceleration in a single direction, such as along an x-axis (or the direction of travel of the vehicle 120). For instance, the area under the curve of an impulse 710 may refer to the area under the curve of an impulse 710 in the x direction. In other cases, the acceleration of a vehicle 120 can refer to acceleration in multiple directions, such as along both the x-axis and y-axis (or lateral direction of the vehicle 120). For instance, the deviation of the acceleration can refer to the deviation the acceleration in the x and y directions. Finally, the acceleration of a vehicle 120 may also, in some cases, refer to the net or overall acceleration of the vehicle 120. For example, the maximum magnitude 800 of an impulse 710 can refer to the net or overall acceleration in x, y, and z directions.

In some embodiments, the trained classifier is a decision tree classifier. Decision trees are a supervised machine learning algorithm that models decisions and their possible consequences as a tree-like structure of nodes. An advantage of using a decision tree classifier is that it can accurately classify collisions using a limited training dataset. As described herein, the inventors recognized and realized that labeled data pertaining to collisions can be difficult to obtain.

Figure 14:
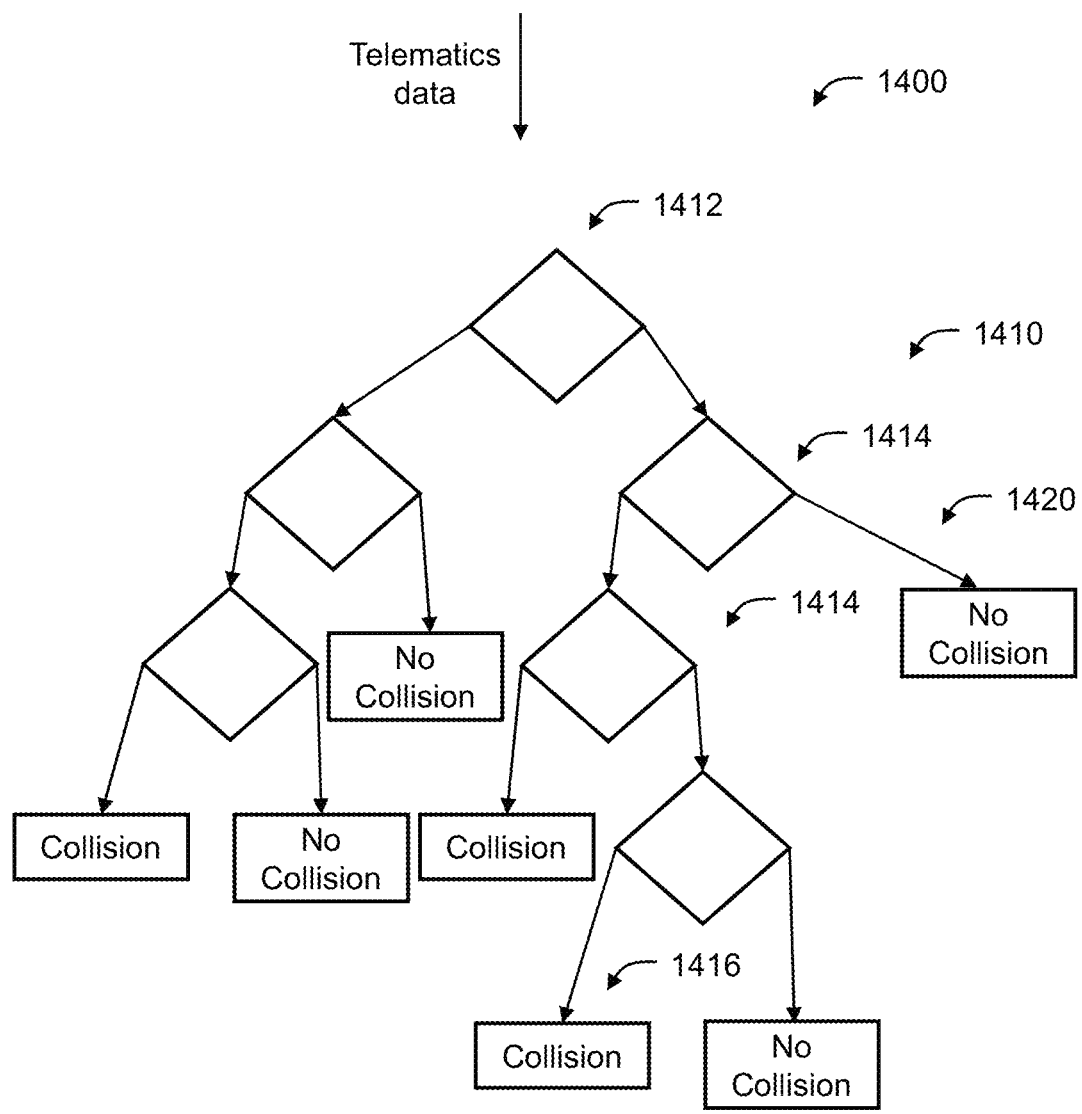
FIG. 14 is a block diagram of an example decision tree, in accordance with an embodiment.

FIG. 14 shows an example decision tree 1400. As shown, the decision tree 1400 can have a hierarchical or tree-like structure made up of a plurality of nodes 1410 and a plurality of branches 1420 connecting the nodes 1410. Each internal or decision node 1414 can represent a decision or test on an attribute, each branch 1420 can represent the outcome of that decision or test, and each end or leaf node 1416 can represent a classification. As shown, each path from the root node 1412 to a leaf node 1414 can represent a classification rule. The structure of the decision tree 1400 (e.g., the attributes evaluated at each node) can be established by a suitable training using suitable training data.

In some embodiments, the trained classifier is a decision tree ensemble classifier. In other words, the trained classifier can include a plurality of decision trees 1400. Using multiple decision trees 1400 in combination can result in better predictive performance as compared to using any constituent decision tree 1400 alone. Examples of decision tree ensemble classifiers may include bagged (or bootstrapped) decision trees, boosted decision trees, and stacked decision trees. However, it should be appreciated that various other types of decision tree ensemble classifiers may be employed.

In some embodiments, the trained classifier is a gradient boosted decision tree classifier. A gradient boosted decision tree generally involves a sequence of trees 1400, where each tree 1400 attempts to correct the errors made by the previous trees 1400.

Figure 15:
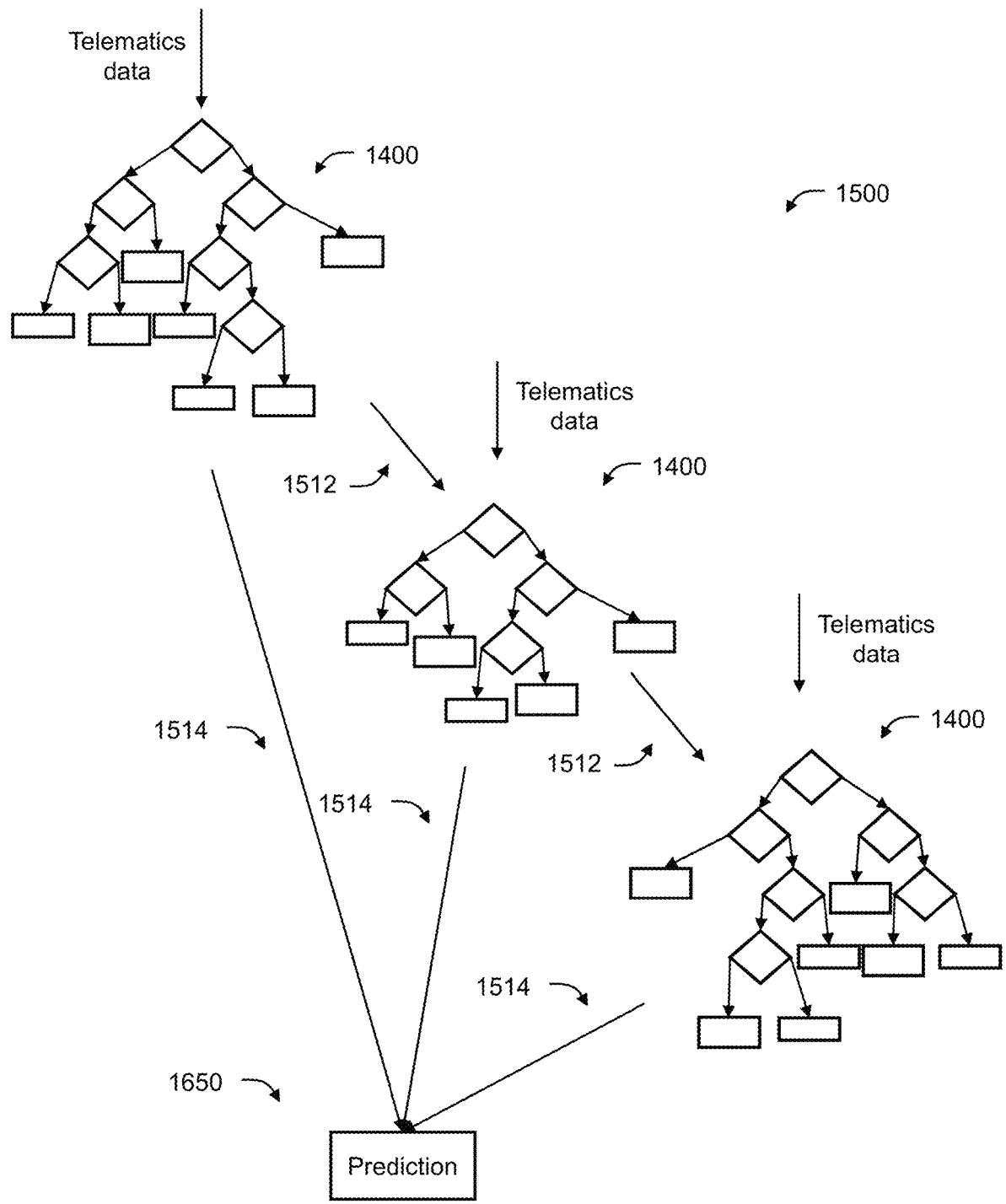
FIG. 15 is a block diagram of an example decision tree ensemble, in accordance with an embodiment.

FIG. 15 shows an example gradient boosted decision tree classifier 1500. As shown, the classifier 1500 includes a plurality of decision trees 1400. The prediction 1514 or output of each decision tree 1400 can be combined to provide an overall prediction or output 1650. Residuals 1512 (differences between observed and estimated values) generated by a given decision tree 1400 can be provided as additional input to the subsequent decision tree 1400. An advantage of using a gradient boosted decision tree classifier is that it can more accurately classify collisions as compared to a single decision tree, while still using a limited training dataset. As described herein, the inventors recognized and realized that labeled data pertaining to collisions can be difficult to obtain.

At 412, various actions can be triggered based on the classification made by the trained classifier at 410. Generally, no action is triggered if the putative collision event 600 is classified as a non-collision event. However, if the putative collision event 600 is classified as a collision event, one or more actions can be triggered.

In some embodiments, the one or more actions can involve notifying at least one user 160 associated with the vehicle 120 that a collision was detected. Various users 160 can be notified at 412, separately or in combination, such as, but are not limited to, a driver of the vehicle 120, a passenger of the vehicle 120, a fleet manager of a fleet to which the vehicle 120 belongs, an insurance entity insuring the vehicle 120, emergency services in the geographical area the vehicle 120 is located, roadside assistance services in the geographical area the vehicle 120, and the like. A user 160 can be notified by a computing device 150 associated with the user 160. The user 160 may be proximate to or in possession of the computing device 150. For example, a user 160 may be notified by a notification that is transmitted to the computing device 150. In some cases, a user 160 may be notified by a notification or alert that is displayed on the computing device 150. A user may also be notified by a report that is accessible to the user 160 through the computing device 150.

Figure 10:
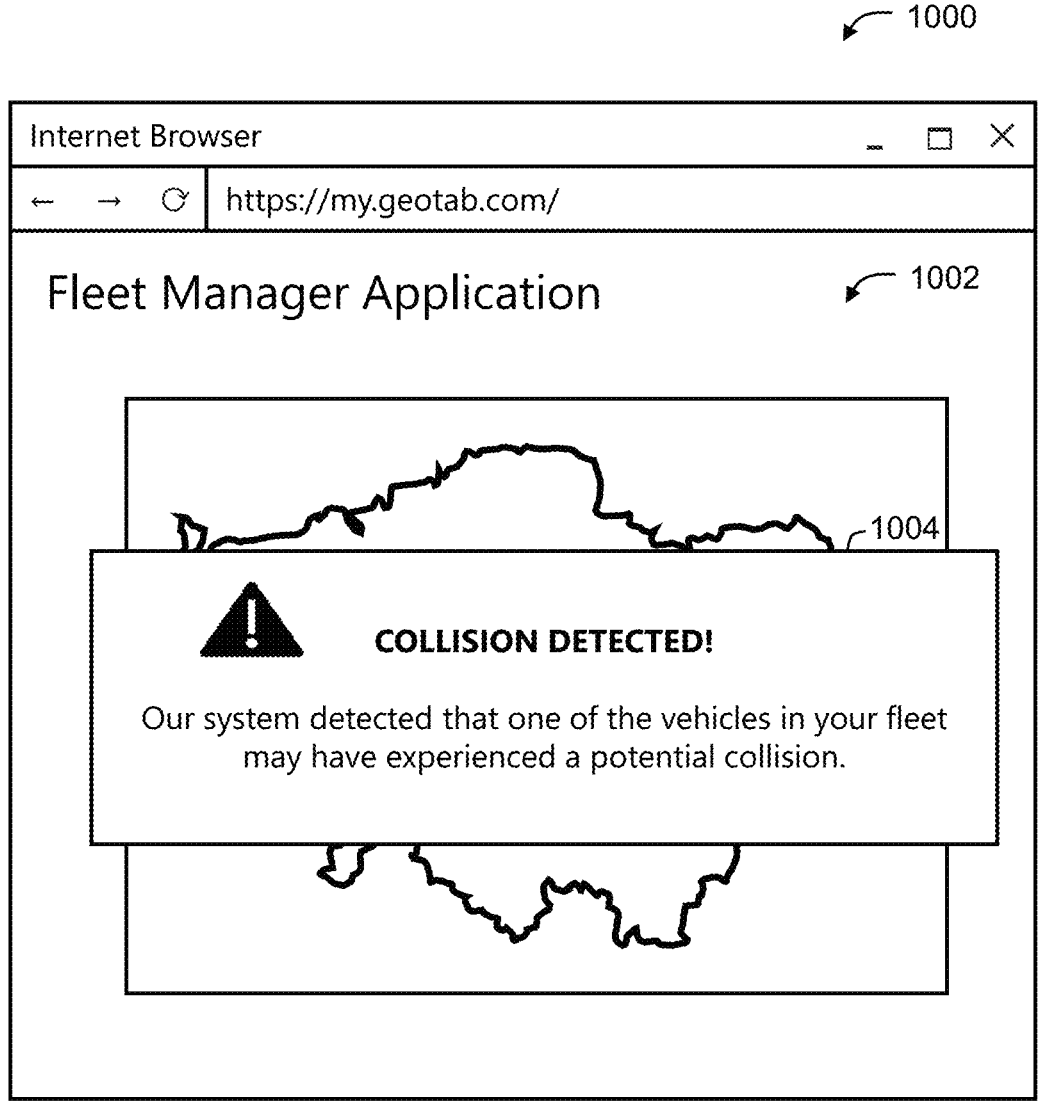
FIG. 10 is an example graphical user interface displaying a notification of a collision event, in accordance with an embodiment.

FIG. 10 shows an example notification 1004 that can be generated at 412. In the illustrated example, the notification 1004 is displayed on a graphical user interface 1002 of a fleet management application 1000 that is accessible through a computing device 150. For example, notification 1004 and graphical user interface 1002 can be displayed on display 158. As shown, the notification 1004 can alert a fleet manager that one of the vehicles 120 in their fleet may have been in a collision. Although the fleet management application 1000 shown in the illustrated example is a browser-based web application, it should be appreciated that the notification 1004 may be sent to and displayed on other types of applications, such as, but not limited to, mobile applications, native desktop applications, etc.

In some embodiments, the one or more actions may involve transmitting a request to confirm whether the collision event occurred. The request can be transmitted to a computing device 150 associated with a user 160 associated with the vehicle 120. For example, the request may be transmitted to a computing device 150 associated with a driver of the vehicle 120, a passenger of the vehicle, or a fleet manager of a fleet to which the vehicle 120 belongs. Upon reviewing the request, the user 160 can submit a response confirming whether the collision event occurred, which can be transmitted back by the computing device 150 and received. An advantage of requesting and receiving responses confirming whether the collision event occurred is that the effectiveness of the classifier can be assessed and improved upon. For example, false positives can be identified and troubleshooted.

Figure 11:
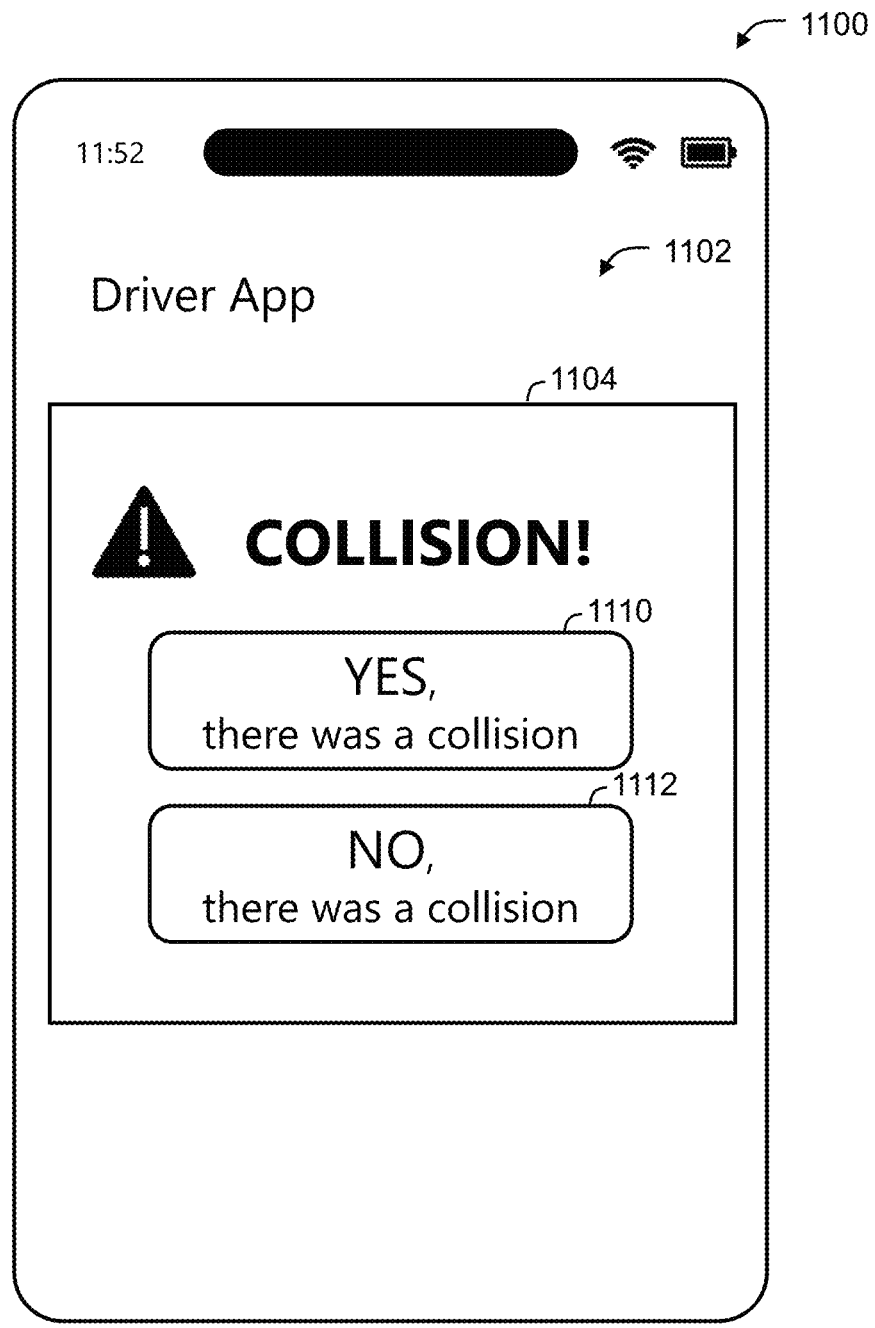
FIG. 11 is an example graphical user interface displaying a request to confirm a collision event, in accordance with an embodiment

FIG. 11 shows an example request 1104 that can be transmitted at 412. In the illustrated example, the request 1104 is displayed on a graphical user interface 1002 of a mobile application 1100 that is accessible through a computing device 150. For example, request 1104 and graphical user interface 1002 can be displayed on display 158. As shown, the request can ask the user 160 to confirm whether a collision occurred. In the illustrated example, the user 160 can select one of the buttons 1110, 1112 to transmit a response indicating whether a collision occurred. Although a mobile application 1100 is shown in the illustrated example, it should be appreciated that the request 1104 can be sent to and displayed on various other types of applications, such as, but not limited to, browser-based web applications, native desktop applications, etc.

In some embodiments, the responses can be used as additional training data. For example, the response confirming whether the collision event occurred can be used as a label for the telematics data used to detect the collision (i.e., the at least one impulse 710). That is, the response and the at least one impulse 710 can be used to further train or retrain the classifier. The inventors recognized and realized that, because of the shortage of labeled collision data, it would be advantageous to be able gather additional training data from other sources. By retraining or further training the classifier using the additional training data, the accuracy of the classifier can be improved.

In some embodiments, the response and the at least one impulse 710 can be used to train another classifier. The other, or second classifier can be a different type of model as compared to the original or first classifier. For example, the first classifier may be a k-nearest neighbor classifier or decision tree classifier and the second classifier may be an artificial neural network. The second classifier can be trained using a larger amount of training data as compared to the first classifier. The inventors realized and recognized it may be impractical, difficult, or even impossible, to initially gather sufficient labeled collision data to train complex models requiring large training datasets, such as artificial neural networks. However, the inventors realized and recognized that additional labeled collision data could be collected based on feedback collected from users 160 in response to collisions detected by a model trained using a smaller dataset, such as a k-nearest neighbor classifier or decision tree classifier.

Figure 12:
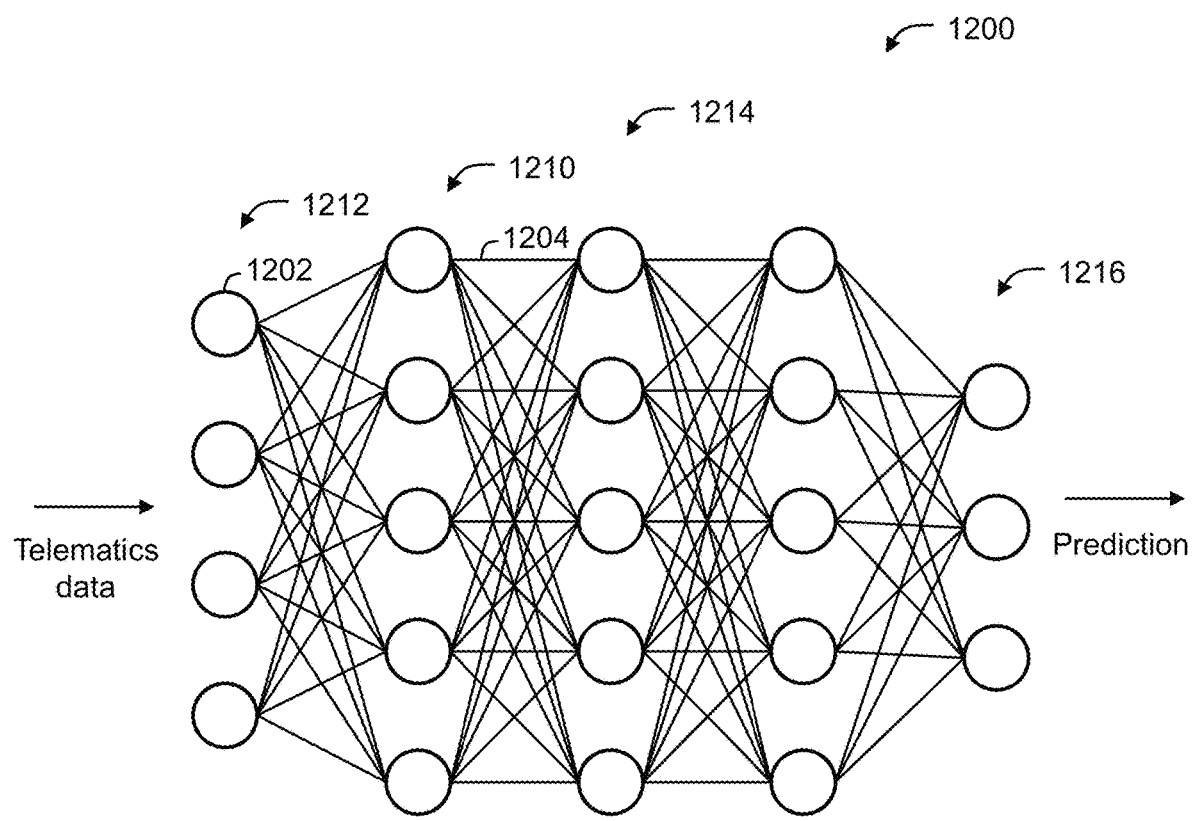
FIG. 12 is a block diagram of an example artificial neural network, in accordance with an embodiment.

FIG. 12 shows an example artificial neural network 1200 that can be trained at 412. The artificial neural network 1200 is a machine learning or artificial intelligence model that is based on the structure and function of a human brain. As shown, the artificial neural network 1200 can include a plurality of nodes or neurons 1202. Each node 1202 can receive input signals, process them, and produce output signals. The nodes 1202 can be interconnected through various connections 1204 and be generally organized into a plurality of layers 1210. In the illustrated example, the layers 1210 include an input layer 1212, which can receive initial data, hidden layers 1214, which perform a variety of computations, and an output layer 1216, which can produce a final output. The connections 1204 between nodes 1202 can have different weights, representing the strength of the connection 1204. The nodes 1202 can have bias parameters that affect their outputs. The artificial neural network 1200 can be trained by adjusting the biases of the nodes 1202 and the weights of the connections 1204 based on labeled training data. The number, arrangement, and nature of the nodes 1202, connections 1204, and layers 1210 can vary, depending on application of the artificial neural network 1200. However, it should be appreciated that, typically, a large amount of training data is required to train an artificial neural network 1200.

As shown in FIG. 4, the collision detection method 400 can optionally be repeated or executed more than once. That is, after the actions are triggered at 412, further telematics data can be received at 402, further putative collision events can be detected at 404, further acceleration data can be identified at 406, further impulses can be detected at 408, further collision events can be determined at 410, and further actions can be triggered at 412. In this manner, the collision detection method 400 can detect vehicle collisions in real time (or substantially real-time) as the telematics data is collected or generated by the telematics devices 130 during operation of the vehicles 120 and received.

Figure 13:
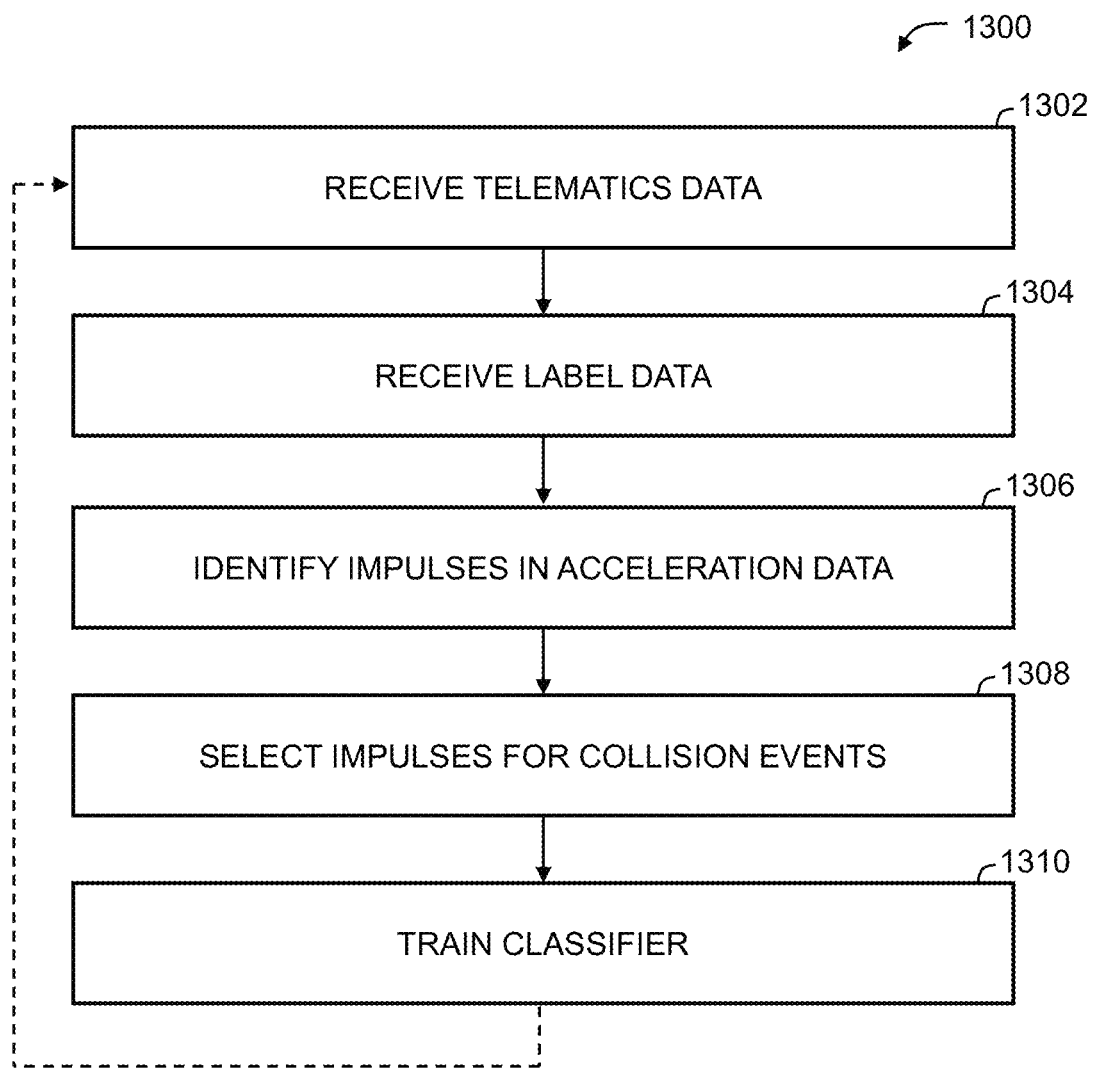
FIG. 13 is a flowchart of an example method for training a classifier to detect vehicle collisions, in accordance with an embodiment.

Referring to FIG. 13, there is shown an example method 1300 for training a classifier to detect vehicle collisions. The collision classifier training method 1300 can be implemented at the fleet management system 110 (e.g., by at least one processor 112 executing instructions stored on at least one data store 114). An advantage of implementing at least a portion of the collision classifier training method 1300 at the fleet management system 110 (i.e., remote from telematics devices 130 and computing devices 150) is that less processing may be executed at the telematics devices 130 and/or computing devices 150. Hence, the hardware complexity and cost of the telematics devices 130 and/or computing devices 150 can be reduced. Furthermore, it may be easier to update and/or modify software running on the fleet management system 110 as compared to the telematics devices 130 and/or computing devices 150. However, it should be appreciated that the collision classifier training method 1300 may also be implemented, at least in part, using one or more telematics devices 130, one or more computing devices 150, or a combination thereof in some embodiments. That is, the collision classifier training method 1300 may be implemented by any of the one or more processors 112, 132, 152 executing instructions stored on any of the one or more data stores 114, 134, 154.

The collision classifier training method 1300 generally involves training a classifier to detect vehicle collisions. The classifier is a machine learning or artificial intelligence model that the inventors recognized and realized could more effectively detect collisions compared to conventional approaches, which are typically heuristics-based. The inventors recognized and realized that by selecting specific features of the telematics data, such as impulses 710 in acceleration data 504, particular models could be trained to effectively detect collisions, even if the model was trained using a relatively small dataset. The inventors recognized that models produced by training method 1300 could improve the speed and accuracy of collision detection, and could therefore help to remedy and minimize the repercussions of vehicle collisions. For example, the classifier training method 1300 can be used to generate trained classifiers that are used by the collision detection method 400 described herein.

At 1302, telematics data can be received. The telematics data can be received from a telematics device 130, fleet management system 110, and/or computing device 150. For example, the telematics data can be received from any of the one or more data stores 114, 134, 154. The telematics data can originate from a plurality of telematics devices 130 installed in a plurality of vehicles 120, for example, being collected or generated by the telematics devices 130 during operation of the vehicles 120. As described herein, the telematics data can include various information pertaining to the operation of the vehicles 120. The telematics data 500 can includes various time series of data points corresponding to various vehicle parameters. Each data point can represent the value of a particular vehicle parameter at a given time. The telematics data can include the various examples of telematics data 500 previously described and shown in FIG. 5, including, but not limited to, speed data 502, acceleration data 504, latitude data 506, longitude data 508, and elevation data 510. It should be appreciated that the telematics data 500 can vary depending on the type of model to be trained by the classifier training method 1300 and the telematics data can include any type of data originating from the telematics device 130 that is suitable for or otherwise compatible with training the model.

At 1304, label data can be received. For example, label data can be received from any of the one or more data stores 114, 134, 154. The label data can identify a plurality of collision events, a plurality of non-collision events, and a portion of the telematics data associated with each collision event and non-collision event. Put another way, the label data can identify a plurality of portions of the telematics data and indicate whether each portion of the telematics data is associated with a collision event or a non-collision event. Each portion of the telematics data can include telematics data from before, after, and during the respective collision or non-collision event. Put another way, each portion of the telematics data can span from a time prior to the respective collision or non-collision event to a time subsequent to the respective collision or non-collision event. The portions of the telematics data can resemble or correspond to those identified in the collision detection method 400 at 406, as previously described and shown in FIG. 6.

At 1306, impulses 710 can be detected. For each portion of the telematics data identified by the label data, at least one impulse 710 can be detected in a corresponding portion of acceleration data 504. That is, at least one impulse 710 can be detected for each collision event and non-collision event. As described herein, each impulse 710 can be defined by a rapid, transient change in acceleration magnitude, such as a rapid increase or decrease from a baseline acceleration value, followed by a rapid return to the baseline acceleration value. The at least one impulse 710 can be identified based on jerk, or the rate of change of acceleration with respect to time, as previously described and shown in FIG. 7, for example. A predetermined jerk threshold can be used to identify the at least one impulse 710. For example, a predetermined jerk threshold can be used detect the start and end of each impulse 710 by detecting jerk values exceeding a predetermined jerk threshold. In some embodiments, the corresponding portion of the acceleration data 504 can be smoothed prior to detecting the at least one impulse.

At 1308, for each portion of the telematics data associated with a collision event, a single impulse 710 can be selected to be associated with the collision event. As will be appreciated, each portion of the acceleration data 504 can contain more than one impulse 710. However, not every impulse 710 may be directly associated with the collision event. These impulses 710 may represent other events that occurred before or after the collision event, such as a secondary collision, for example, caused by the impact of the primary collision event. The single impulse 710 can represent the impulse 710 that is most likely to be directly associated with collision event. Various criteria, alone or in combination, may be used to select the single impulse 710. For example, the maximum acceleration magnitude 800 of the impulses 710 may be used to select the single impulses 710. Likewise, the duration 850 of the impulses 710 may be used to select the single impulses. In some embodiments, the impulse having the largest maximum magnitude 800 and duration 850 can be selected as the single impulse. It should be appreciated that additional, fewer, or other criterion, alone or in combination, may be used to select the single impulse 710.

At 1310, a classifier can be trained to determine whether an event is a collision event based on an impulse 710 associated with the event. Various types of classifiers may be trained, including machine learning or artificial intelligence models. Generally, the model can be any type of model that is trained to determine whether an impulse 710 corresponds a collision event, without being explicitly programmed to do so. As described herein, the inventors recognized and realized that machine learning or artificial intelligence models could potentially be more effective at collision detection as compared to traditional heuristics-based approaches. The nature of the training can depend on the type of model being trained. For example, supervised, unsupervised, semi-supervised, reinforcement, or other types of learning may be employed.

Various features may be used to train the model. In some embodiments, the model can be trained based on impulses 710. For example, the model can be trained using the at least one impulse 710 for each portion of the telematics data associated with a non-collision event and the single impulse 710 for each portion of the telematics data associated with a collision event. As described herein, the inventors recognized and realized it can be difficult to obtain labeled data pertaining to collisions. Accordingly, the inventors recognized and realized that a larger training dataset could be achieved by using all of the impulses 710 associated with non-collision events, while only using a single impulse 710 associated with collision events. In some cases, the model may be trained using a plurality of impulses 710 for each portion of the telematics data associated with a non-collision event. However, in some embodiments, the model may be trained using only a subset of the at least one impulse 710. For example, the classifier may trained using on a single impulse 710 in the at least one impulse 710. For instance, the classifier may be trained using the largest impulse 710.

Various properties of the impulses 710 may be used to train the model. For example, the model can be trained used on the maximum magnitude 800 and duration 850 of the at least one impulse 710 for each portion of the telematics data associated with a non-collision event and the single impulse 710 for each portion of the telematics data associated with a collision event. As described herein, the inventors recognized that the maximum magnitude 800 and duration 850 of impulses were features that could be effectively used by a model to distinguish between collision events (e.g., having larger impulses of longer duration) and non-collision events (e.g., having smaller impulses of shorter duration).

In some embodiments, additional or other features, or combinations of features, may be used to train the model. For example, the model may be trained using an area under of the curve of the at least one impulse 710 for each portion of the telematics data associated with a non-collision event and an area under the curve of the single impulse 710 for each portion of the telematics data associated with a collision event. As described herein, the inventors recognized and realized that the area under the curve of an impulse 710 could be effectively used by a model to distinguish between collision events (having larger areas) and non-collision events (having smaller areas).

The inventors recognized and realized that the deviation of the acceleration data 504 could be effectively used by a model to distinguish between collision events (having less deviation) and non-collision events (having more deviation when there is noise or other unwanted data). As well, the model may be trained using corresponding portions of the location data. The inventors recognized and realized that location data may be used as a feature by the classifier to distinguish between collision events (where a vehicle 120 is likely to comes to a stop) from non-collision events (where a vehicle 120 is unlikely to come to a stop). In general, any feature extracted from the telematics data, including other features that may be extracted from the acceleration data 504, may be used to train the model. In some cases, some or all of the features may be normalized or otherwise scaled to improve the accuracy of the model.

In various embodiments, the classifier can be a k-nearest neighbor classifier. The inventors recognized and realized that a k-nearest neighbors classifier could accurately classify collisions using a limited training dataset. The k-nearest neighbor classifier can be trained using a supervised learning approach. More specifically, the k-nearest neighbor classifier can be trained by storing a labeled dataset. The labeled dataset includes a plurality of training examples. Each training example includes one or more features and a class label. An example of a k-nearest neighbor classifier 800 is shown in FIG. 8. In the illustrated example, the training examples are impulses 710 and the features of the training examples are the maximum magnitude 800 and duration 850 of the impulses 710. As shown, each training example is labeled with a class—a non-collision event 912 or a collision event 914.

In other embodiments, the classifier may be another type of machine learning or artificial intelligence model. As described herein, the classifier can generally be any type of model that is trained to determine whether an event is a collision event, without being explicitly programmed to do so. For example, the classifier may be an artificial neural network 1200, as described herein and shown in FIG. 12.

In some embodiments, the classifier may be a decision tree classifier. Where the machine learning classifier is a decision tree, the training may involve using various entropy, information gain, and/or Gini impurity metrics, to determine the appropriate nodes and branching for the decision tree. For example, ID3 (Iterative Dichotomiser 3), C4.5, CART (Classification And Regression Tree), or similar algorithms may be utilized.

In some embodiments, the classifier may be a decision tree ensemble classifier. The training for a decision tree ensemble can depend on the type of ensemble. For example, for a gradient boosted decision tree, the training can involve building trees one at a time, where each new tree is created to account for the residuals or errors of the previous trees. Various algorithms can be used to train a gradient boosted decision tree, including but not limited to XGBoost (extreme Gradient Boosting), LightGBM, CatBoost, AdaBoost (Adaptive Boosting), and the like. As another example, for a bootstrapped or bagged decision tree, the training can involve creating random bootstraps or subsets of the training data and constructing decision trees using the bootstraps.

As shown in FIG. 13, the training method 1300 can optionally be repeated or executed more than once. That is, after the classifier is trained at 1310, further telematics data can be received at 1302, further label data can be received at 1304, further impulses can be identified at 1306, further single impulses for collision events can be selected at 1308, and classifiers can be further trained at 1310. In this manner, the training method 1300 can train new classifiers or retrain existing classifiers in real-time (or substantially real-time) as the telematics data is collected or generated by the telematics devices 130 during operation of the vehicles 120 and received with label data.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for detecting vehicle collisions, the method comprising operating at least one processor to:
   receive telematics data originating from a telematics device installed in a vehicle, the telematics data comprising acceleration data;
   detect a putative collision event based on the acceleration data exceeding a predetermined acceleration threshold;
   identify a portion of the acceleration data associated with the putative collision event, the portion of the acceleration data spanning from a time prior to the putative collision event to a time subsequent to the putative collision event;
   identify at least one impulse in the portion of the acceleration data based on a predetermined jerk threshold;
   use a trained classifier on the at least one impulse to determine that the putative collision event is a collision event; and
   in response to determining the collision event, trigger at least one action responsive to the collision event, the at least one action comprising:
      transmitting a request to confirm whether the collision event occurred to a computing device associated with the vehicle;
      receiving a response to the request confirming whether the collision event occurred; and
      training a second classifier based on the at least one impulse and the response.

2. The method of claim 1, wherein the trained decision tree classifier is a trained gradient boosted decision tree classifier.

3. The method of claim 1, wherein the trained classifier is used on a maximum magnitude of the at least one impulse.

4. The method of claim 1, wherein the trained classifier is used on a duration of the at least one impulse.

5. The method of claim 1, wherein the trained classifier is used on an area under the curve of the at least one impulse.

6. The method of claim 1, wherein the trained classifier is used on a deviation of the portion of the acceleration data associated with the putative collision event.

7. The method of claim 1, wherein detecting the putative collision event comprises:
   determining whether the acceleration data exceeds a predetermined acceleration threshold for a duration exceeding a predetermined time threshold.

8. The method of claim 1, further comprising operating the at least one processor to:
   retrain the trained classifier based on the at least one impulse and the response.

9. A non-transitory computer readable medium having instructions stored thereon executable by at least one processor to implement a method for detecting vehicle collisions, the method comprising operating the at least one processor to:
   receive telematics data originating from a telematics device installed in a vehicle, the telematics data comprising acceleration data;
   detect a putative collision event based on the acceleration data exceeding a predetermined acceleration threshold;
   identify a portion of the acceleration data associated with the putative collision event, the portion of the acceleration data spanning from a time prior to the putative collision event to a time subsequent to the putative collision event;
   identify at least one impulse in the portion of the acceleration data based on a predetermined jerk threshold;
   use a trained classifier on the at least one impulse to determine that the putative collision event is a collision event; and
   in response to determining the collision event, trigger at least one action responsive to the collision event, the at least one action comprising:
      transmitting a request to confirm whether the collision event occurred to a computing device associated with the vehicle;
      receiving a response to the request confirming whether the collision event occurred; and
      training a second classifier based on the at least one impulse and the response.

10. A system for detecting vehicle collisions, the system comprising:
   at least one data store operable to store telematics data originating from a telematics device installed in a vehicle, the telematics data comprising acceleration data;
   at least one processor in communication with the at least one data store, the at least one processor operable to:
      receive the telematics data;
      detect a putative collision event based on the acceleration data exceeding a predetermined acceleration threshold;

identify a portion of the acceleration data associated with the putative collision event, the portion of the acceleration data spanning from a time prior to the putative collision event to a time subsequent to the putative collision event;

identify at least one impulse in the portion of the acceleration data based on a predetermined jerk threshold;

use a trained classifier on the at least one impulse to determine that the putative collision event is a collision event; and in response to determining the collision event, trigger at least one action responsive to the collision event, the at least one action comprising:
- transmitting a request to confirm whether the collision event occurred to a computing device associated with the vehicle;
- receiving a response to the request confirming whether the collision event occurred; and
- training a second classifier based on the at least one impulse and the response.

11. The system of claim 10, wherein the trained decision tree classifier is a trained gradient boosted decision tree classifier.

12. The system of claim 10, wherein the trained classifier is used on a maximum magnitude of at least one impulse.

13. The system of claim 10, wherein the trained classifier is used on a duration of the at least one impulse.

14. The system of claim 10, wherein the trained classifier is used on an area under the curve of the at least one impulse.

15. The system of claim 10, wherein the trained classifier is used on a deviation of the portion of the acceleration data associated with the putative collision event.

16. The system of claim 10, wherein detecting the putative collision event comprises:
- determining whether the acceleration data exceeds a predetermined acceleration threshold for a duration exceeding a predetermined time threshold.

17. The system of claim 10, wherein the at least one processor is operable to:
- retrain the trained classifier based on the at least one impulse and the response.

* * * * *